US012334530B2

(12) United States Patent
Maeda et al.

(10) Patent No.: US 12,334,530 B2
(45) Date of Patent: Jun. 17, 2025

(54) COOLING WATER CIRCUIT

(71) Applicant: DENSO CORPORATION, Kariya (JP)

(72) Inventors: Takahiro Maeda, Kariya (JP); Yoshiki Katoh, Kariya (JP); Masamichi Makihara, Kariya (JP); Kuniyoshi Tanioka, Kariya (JP); Kouji Miura, Kariya (JP)

(73) Assignee: DENSO CORPORATION, Kariya (JP)

( * ) Notice: Subject to any disclaimer, the term of this patent is extended or adjusted under 35 U.S.C. 154(b) by 727 days.

(21) Appl. No.: 17/454,157

(22) Filed: Nov. 9, 2021

(65) Prior Publication Data

US 2022/0069387 A1 Mar. 3, 2022

Related U.S. Application Data

(63) Continuation of application No. PCT/JP2020/017396, filed on Apr. 22, 2020.

(30) Foreign Application Priority Data

May 14, 2019 (JP) ................. 2019-091519

(51) Int. Cl.
*H01M 10/66* (2014.01)
*B60H 1/00* (2006.01)
(Continued)

(52) U.S. Cl.
CPC ...... *H01M 10/663* (2015.04); *B60H 1/00885* (2013.01); *B60H 1/03* (2013.01);
(Continued)

(58) Field of Classification Search
CPC ............. H01M 10/663; H01M 10/613; H01M 10/625; H01M 10/6568; H01M 2220/20;
(Continued)

(56) References Cited

U.S. PATENT DOCUMENTS

2018/0264913 A1  9/2018 Enomoto et al.

FOREIGN PATENT DOCUMENTS

JP          04133820    *  5/1992  ............. B60K 11/04
JP          H04133820 A    5/1992
(Continued)

*Primary Examiner* — Raymond Alejandro
(74) *Attorney, Agent, or Firm* — Harness, Dickey & Pierce, P.L.C.

(57) ABSTRACT

A cooling water circuit includes: a heat-radiating heat exchanger in which a cooling water is heated by heat radiated from an external heat medium; a heat-absorbing heat exchanger in which a cooling water is cooled by heat absorbed by an external heat medium; and a first heat exchanger and a second heat exchanger in which heat is exchanged between the cooling water and outside air. When a high-temperature cooling water heated by the heat-radiating heat exchanger flows through the first heat exchanger and the second heat exchanger, the first heat exchanger and the second heat exchanger are arranged in series for the cooling water to flow. When a low-temperature cooling water cooled by the heat-absorbing heat exchanger flows through the first heat exchanger and the second heat exchanger, the first heat exchanger and the second heat exchanger are arranged in parallel for the cooling water to flow.

12 Claims, 15 Drawing Sheets

(51) Int. Cl.
 *B60H 1/03* (2006.01)
 *H01M 10/613* (2014.01)
 *H01M 10/625* (2014.01)
 *H01M 10/6568* (2014.01)
 *H01M 10/663* (2014.01)

(52) U.S. Cl.
 CPC ....... *H01M 10/613* (2015.04); *H01M 10/625* (2015.04); *H01M 10/6568* (2015.04); *B60H 2001/00928* (2013.01); *H01M 2220/20* (2013.01)

(58) Field of Classification Search
 CPC .................. B60H 1/00885; B60H 1/03; B60H 2001/00928
 See application file for complete search history.

(56) References Cited

FOREIGN PATENT DOCUMENTS

| | | |
|---|---|---|
| JP | 2004224089 A | 8/2004 |
| JP | 2014020280 A | 2/2014 |
| JP | 2016144963 A | 8/2016 |

* cited by examiner

COOLING WATER CIRCUIT

CROSS REFERENCE TO RELATED APPLICATION

The present application is a continuation application of International Patent Application No. PCT/JP2020/017396 filed on Apr. 22, 2020, which designated the U.S. and claims the benefit of priority from Japanese Patent Application No. 2019-91519 filed on May 14, 2019. The entire disclosures of all of the above applications are incorporated herein by reference.

TECHNICAL FIELD

The present disclosure relates to a cooling water circuit for a cooling system that cools an in-vehicle device or a heat pump system for air-conditioning in an electric vehicle.

BACKGROUND

A cooling water circuit is mounted on an electric vehicle such as a hybrid vehicle. The cooling water circuit includes a radiator for cooling the engine and a radiator for radiating heat from the heater circuit. The radiators are connected by a pipe, and a valve is provided in the pipe.

SUMMARY

According to an aspect of the present disclosure, a cooling water circuit includes:
 a heat-radiating heat exchanger in which a cooling water is heated by heat radiated from an external heat medium;
 a heat-absorbing heat exchanger in which a cooling water is cooled by heat absorbed by an external heat medium; and
 a first heat exchanger and a second heat exchanger in which heat is exchanged between the cooling water and outside air.

When a high-temperature cooling water heated by the heat-radiating heat exchanger flows through the first heat exchanger and the second heat exchanger, the first heat exchanger and the second heat exchanger are connected in series for the cooling water to flow.

When a low-temperature cooling water cooled by the heat-absorbing heat exchanger flows through the first heat exchanger and the second heat exchanger, the first heat exchanger and the second heat exchanger are connected in parallel for the cooling water to flow.

DESCRIPTION OF EMBODIMENT

Figure 1:
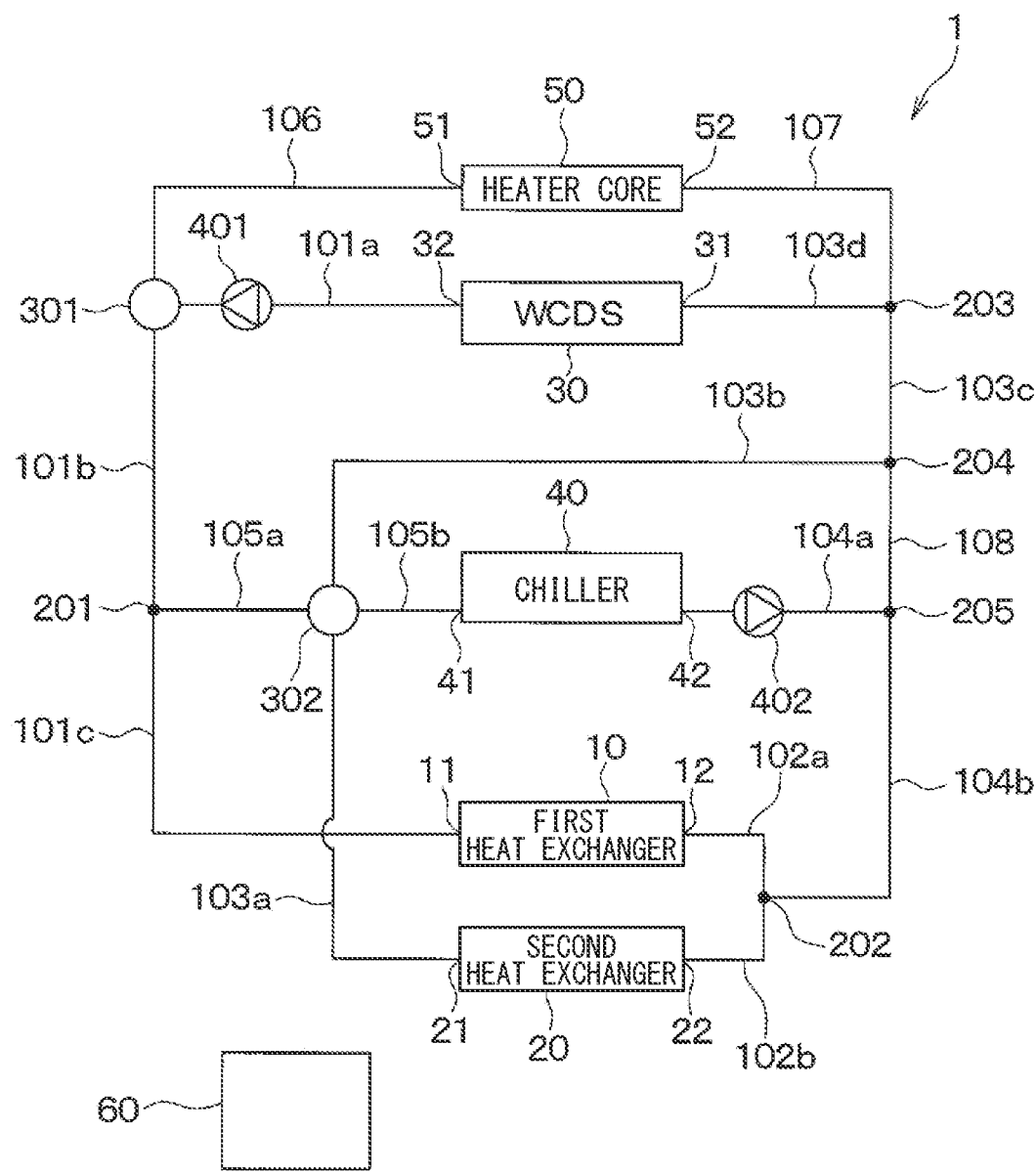
FIG. 1 is a circuit diagram showing a cooling water circuit according to a first embodiment.

To begin with, examples of relevant techniques will be described.

A cooling water circuit is mounted on an electric vehicle such as a hybrid vehicle. The cooling water circuit includes a radiator for cooling the engine and a radiator for radiating heat from the heater circuit. The radiators are connected by a pipe, and a valve is provided in the pipe.

The cooling water circuit is configured so that the cooling water flows to both of the two radiators when the engine load is high at summer. However, in winter, when one of the radiators is used as a heat absorber of a heat pump that absorbs heat of outside air, only one of the two radiators is used and the other radiator is not used. In this case, the radiators may not be used efficiently in the cooling water circuit. The present disclosure provides a cooling water circuit capable of efficiently using heat exchangers to increase the air conditioning capacity.

According to an aspect of the present disclosure, a cooling water circuit includes:
 a heat-radiating heat exchanger in which a cooling water is heated by heat radiated from an external heat medium;
 a heat-absorbing heat exchanger in which a cooling water is cooled by heat absorbed by an external heat medium; and
 a first heat exchanger and a second heat exchanger in which heat is exchanged between the cooling water and outside air.

When a high-temperature cooling water heated by the heat-radiating heat exchanger flows through the first heat exchanger and the second heat exchanger, the first heat exchanger and the second heat exchanger are connected in series for the cooling water to flow, and
 when a low-temperature cooling water cooled by the heat-absorbing heat exchanger flows through the first heat exchanger and the second heat exchanger, the first heat exchanger and the second heat exchanger are connected in parallel for the cooling water to flow.

Accordingly, the high-temperature cooling water heated by the heat-radiating heat exchanger flows through the first heat exchanger and the second heat exchanger in series. Therefore, it is possible to increase the amount of heat radiated from the cooling water to the outside air by lengthening the path through which the cooling water flows through the first heat exchanger and the second heat exchanger.

The low-temperature cooling water cooled by the heat-absorbing heat exchanger flows through the first heat exchanger and the second heat exchanger in parallel. Therefore, even when the viscosity of the cooling water is high, the pressure loss can be reduced by increasing the cross-sectional area of the flow path through which the cooling water flows in the first heat exchanger and the second heat exchanger and reducing the flow velocity of the cooling water.

Therefore, the efficiency of heat exchange between the outside air and the cooling water can be improved by the first heat exchanger and the second heat exchanger in the cooling water circuit, both the case where the high-temperature cooling water flows through and the case where the low-temperature cooling water flows through. As a result, when the cooling water circuit is used as, for example, heat pump system for air-conditioning, the capacity of the air-conditioning can be increased.

Further, since the pressure loss can be reduced in the cooling water circuit when the low-temperature cooling water flows through the first heat exchanger and the second heat exchanger, the water pump that circulates the cooling water in the circuit can be downsized.

The reference numerals attached to the components and the like indicate an example of correspondence between the components and the like and specific components and the like described in embodiments to be described below.

Embodiments of the present disclosure will now be described with reference to the drawings. Parts that are identical or equivalent to each other in the following embodiments are assigned the same reference numerals and will not be described.

First Embodiment

A first embodiment will be described with reference to the drawings. The cooling water circuit of the first embodiment is used, for example, in a heat pump system for conditioning air for an electric vehicle. For the cooling water circulating in the cooling water circuit, for example, an antifreeze solution containing ethylene glycol or the like as a main component, a long-life coolant, or the like is used. The long life coolant is sometimes called LLC.

<Cooling Water Circuit>

The configuration of the cooling water circuit will be described.

Figure 2:
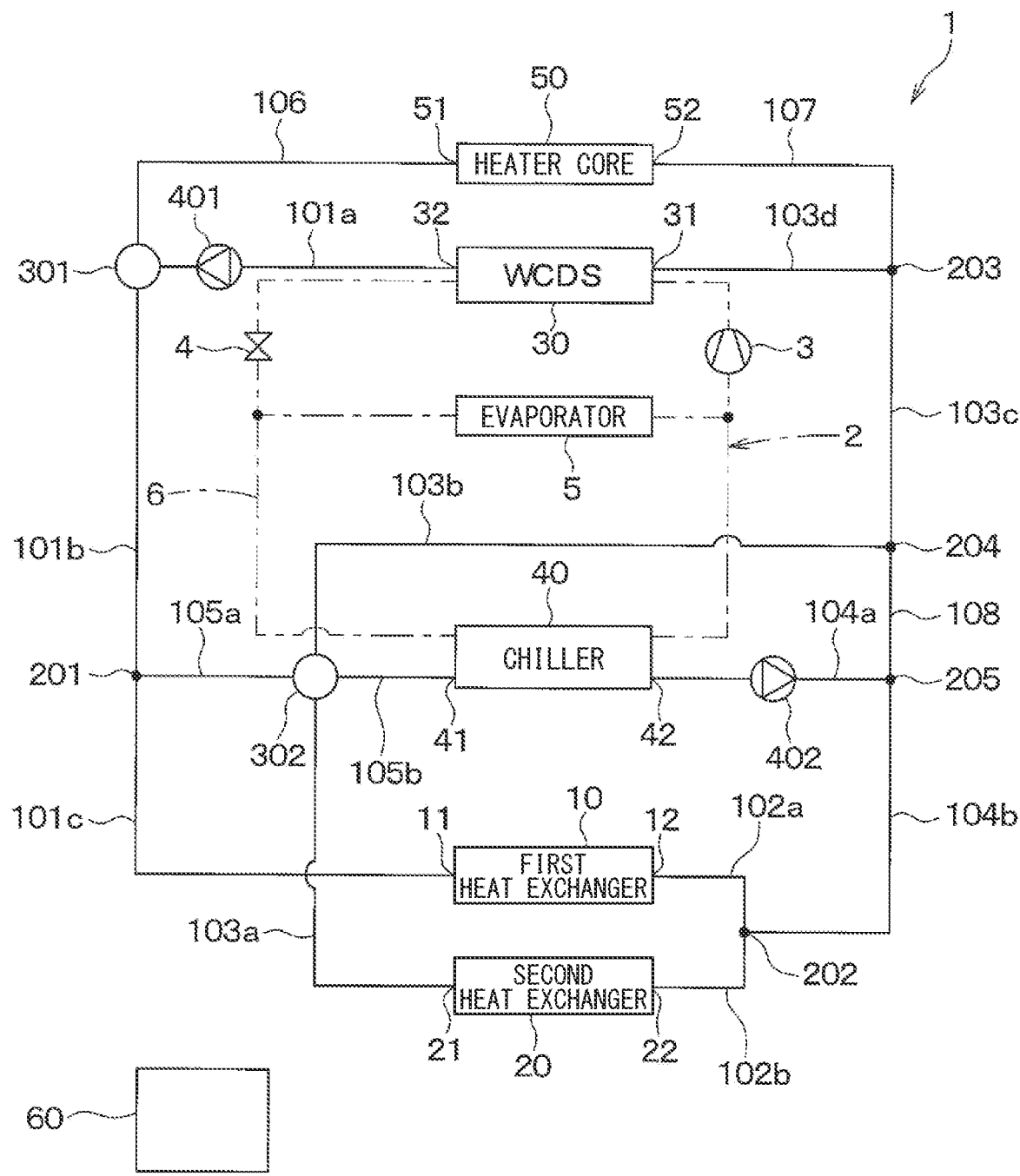
FIG. 2 is a circuit diagram showing the cooling water circuit and a refrigeration cycle according to the first embodiment.

As shown in FIG. 1, the cooling water circuit 1 includes a first heat exchanger 10, a second heat exchanger 20, a water cooling condenser 30 as a heat-radiating heat exchanger, a chiller 40 as a heat-absorbing heat exchanger, and a heater core 50, which are connected by pipes 101 to 108. The cooling water circuit 1 further includes valves 301, 302, water pumps 401, 402, and a controller 60. Then, as shown in FIG. 2, the cooling water circuit 1 of the first embodiment is used together with a refrigeration cycle 2. In FIG. 2, a refrigerant pipe 6 of the refrigeration cycle 2 is shown by a single chain line.

The first heat exchanger 10 and the second heat exchanger 20 are configured to exchange heat between air outside the cabin (hereinafter referred to as "outside air") and the cooling water. The first heat exchanger 10 and the second heat exchanger 20 are integrally configured with each other. The first heat exchanger 10 and the second heat exchanger 20 are configured as one module. The first heat exchanger 10 and the second heat exchanger 20 are arranged at a front portion in the hood of the vehicle, and arranged in the flow direction of the outside air. The first heat exchanger 10 is arranged on the downstream side in the flow direction of the outside air with respect to the second heat exchanger 20.

The first heat exchanger 10 has a first inlet/outlet 11, tubes (not shown) and a second inlet/outlet 12 communicated with each other in this order. The second heat exchanger 20 also has a first inlet/outlet 21, tubes (not shown) and a second inlet/outlet 22 communicated with each other in this order.

The first heat exchanger 10 and the second heat exchanger 20 function as radiator that radiates heat of the cooling water to the outside air when the temperature of the cooling water is higher than the temperature of outside air. Further, the first heat exchanger 10 and the second heat exchanger 20 function as heat absorber that absorbs heat of the outside air into the cooling water when the temperature of the cooling water is lower than the temperature of outside air.

The heat-radiating heat exchanger is configured so that the cooling water is heated by the heat radiated from an external heat medium. In the first embodiment, the external heat medium that heats the cooling water flowing through the heat-radiating heat exchanger is a high-pressure side refrigerant that circulates in the refrigeration cycle 2. That is, the heat-radiating heat exchanger is the water cooling condenser 30 in which heat is exchanged between the high-pressure side refrigerant that circulates in the refrigeration cycle 2 and the cooling water. The cooling water flowing through the water cooling condenser 30 is heated by the heat of the high-pressure side refrigerant circulating in the refrigeration cycle 2.

The heat-absorbing heat exchanger is configured so that the cooling water is cooled by heat absorbed by an external heat medium. In the first embodiment, the external heat medium that cools the cooling water flowing through the heat-absorbing heat exchanger is the low-pressure side refrigerant that circulates in the refrigeration cycle 2. That is, the heat-absorbing heat exchanger is the chiller 40 in which heat is exchanged between the cooling water and the low-pressure side refrigerant that circulates in the refrigeration cycle 2. The cooling water flowing through the chiller 40 is cooled by the heat absorbed by the low-pressure side refrigerant circulating in the refrigeration cycle 2.

The heater core 50 is provided in a case of an air conditioner unit (not shown). The heater core 50 is a heat exchanger that exchanges heat between air supplied from the air conditioner unit into the cabin and the cooling water. The air conditioner unit is configured such that the air passing through the heater core 50 is heated by the high-temperature cooling water flowing through the heater core 50 and blown out into the cabin.

The cooling water circuit 1 includes the first to eighth pipes 101 to 108 for connecting the above-mentioned heat exchangers. An alphabet is added to the end of the reference code of each pipe. In the following description, an alphabet will be added to the end of the reference code of each pipe as necessary.

The first pipe 101 connects the cooling water outlet 32 of the water cooling condenser 30 and the first inlet/outlet 11 of the first heat exchanger 10. The second pipe 102 connects the second inlet/outlet 12 of the first heat exchanger 10 and the second inlet/outlet 22 of the second heat exchanger 20.

The third pipe 103 connects the first inlet/outlet 21 of the second heat exchanger 20 and the cooling water inlet 31 of the water cooling condenser 30.

The fourth pipe 104 connects the cooling water outlet 42 of the chiller 40 and a second connection point 202 provided between pipes 102a, 102b of the second pipe 102. The fifth pipe 105 includes a pipe 105a connecting a first connection point 201 provided between pipes 101b, 101c of the first pipe 101, and a second valve 302 provided between pipes 103a, 103b of the third pipe 103. The fifth pipe 105 includes a pipe 105a connecting the second valve 302 and a cooling water inlet 41 of the chiller 40.

The sixth pipe 106 connects the first valve 301 provided between the pipes 101a, 101b of the first pipe and the cooling water inlet 51 of the heater core 50. The seventh pipe 107 connects the third connection point 203 provided between the pipes 103c, 103d of the third pipe 103 and the cooling water outlet 52 of the heater core 50.

The eighth pipe 108 connects the fourth connection point 204 provided between the pipes 103b, 103c of the third pipe 103 and the fifth connection point 205 provided between the pipes 104a, 104b of the fourth pipe 104. In the first embodiment, the eighth pipe 108 can be omitted.

The valve 301, 302 is a flow rate control valve or flow path switching valve that control the flow rate of the cooling water flowing through the water cooling condenser 30 and the flow rate of the cooling water flowing through the chiller 40 after flowing through the first heat exchanger 10 and the second heat exchanger 20. In the first embodiment, the valves 301, 302 include the first valve 301 and the second valve 302.

The first valve 301 is a three-way valve provided at a connection point among the pipe 101a, the pipe 101b and the sixth pipe 106. The first valve 301 can control the flow rate of the cooling water flowing from the cooling water outlet 32 of the water cooling condenser 30 toward the first heat exchanger 10 via the pipes 101b and 101c. At the same time, the first valve 301 can control the flow rate of the cooling water flowing from the cooling water outlet 32 of the water cooling condenser 30 to the heater core 50 via the sixth pipe 106.

The second valve 302 is a four-way valve provided at a connection point among the pipes 103a, 103b, 105a and 105b. The second valve 302 can control the state of the cooling water flowing from the first inlet/outlet 21 of the second heat exchanger 20 at the pipe 103a toward the water cooling condenser 30 via the pipes 103b, 103c, 103d. At the same time, the second valve 302 can control the state of the cooling water flowing from the first inlet/outlet 21 of the second heat exchanger 20 at the pipe 103a toward the chiller 40 via the pipe 105b. Further, the second valve 302 can allow or block the cooling water flowing through the pipes 101b and 101c from flowing toward the chiller 40 via the pipes 105a and 105b.

The water pump 401, 402 is an electric or mechanical pump configured to circulate the cooling water in the cooling water circuit 1. In the first embodiment, the water pumps 401 and 402 are referred to the first water pump 401 and the second water pump 402.

The first water pump 401 is provided at a position where the cooling water can be circulated in the path including the water cooling condenser 30. In the first embodiment, the first water pump 401 is provided in the middle of the pipe 101a of the first pipe 101 that connects the cooling water outlet 32 of the water cooling condenser 30 and the first valve 301.

The second water pump 402 is provided at a position where the cooling water can be circulated in the path including the chiller 40. In the first embodiment, the second water pump 402 is provided in the middle of the pipe 104a of the fourth pipe 104 that connects the cooling water outlet 42 of the chiller 40 and the fifth connection point 205.

The controller 60 is composed of a microcomputer having a CPU, a ROM, a RAM, and the like, and peripheral circuits thereof. A memory such as a ROM or RAM is a non-transitional tangible storage medium. The controller 60 controls each part of the cooling water circuit 1 by executing a program stored in advance in response to an air conditioning request or the like. The control by the controller 60 will be described later.

<Structure of Refrigeration Cycle 2>

Next, the configuration of the refrigeration cycle 2 used together with the cooling water circuit 1 of the first embodiment will be described.

The refrigeration cycle 2 is a vapor compression refrigerator in which a compressor 3, a water cooling condenser 30, an expansion valve 4, a chiller 40, an evaporator 5, and the like are connected by a refrigerant pipe 6. The refrigeration cycle 2 uses a fluorocarbon-based refrigerant as the refrigerant, and constitutes a subcritical refrigeration cycle in which the high-pressure side refrigerant pressure does not exceed the critical pressure of the refrigerant.

The compressor 3 sucks in, compresses, and discharges the refrigerant circulating in the refrigeration cycle 2. The rotation speed of the compressor 3 is controlled by the controller 60. The rotation speed of the compressor 3 corresponds to the amount of work that the compressor 3 compresses the refrigerant.

The water cooling condenser 30 is a heat exchanger that condenses the high-pressure refrigerant by exchanging heat between the high-temperature and high-pressure refrigerant discharged from the compressor 3 and the cooling water circulating in the cooling water circuit 1.

The expansion valve 4 is a fixed throttle such as an orifice or a nozzle, or a variable throttle such as a temperature expansion valve or an electronic expansion valve. The expansion valve 4 is a decompressor for depressurizing and expanding the liquid phase refrigerant flowing out of the condenser.

The chiller 40 is a heat exchanger that evaporates the low-pressure refrigerant by exchanging heat between the low-pressure gas-liquid two-phase refrigerant that has been decompressed and expanded by the expansion valve 4 and the cooling water that circulates in the cooling water circuit 1. The vapor phase refrigerant evaporated in the chiller 40 is sucked into the compressor 3.

The evaporator 5 is provided in a casing (not shown) of an air conditioner unit. The evaporator 5 is a heat exchanger to evaporate the low-pressure refrigerant by exchanging heat between the low-pressure gas-liquid two-phase refrigerant that has been decompressed and expanded by the expansion valve 4 and air supplied from the air conditioner unit to the cabin. The air conditioner unit is configured such that the air passing through the evaporator 5 is cooled by the heat of vaporization of the refrigerant flowing through the evaporator 5 and blown out into the cabin. The vapor phase refrigerant evaporated by the evaporator 5 is sucked into the compressor 3.

<Operation of Cooling Water Circuit>

Subsequently, the operation of the cooling water circuit 1 of the first embodiment will be described.

The operation of the cooling water circuit 1 is controlled by the controller 60. The controller 60 controls the drive of the valves 301 and 302 and the water pumps 401 and 402 in response to an air conditioning request and the like.

In the drawings referred to in the description of the operation of the cooling water circuit 1, the pipes of the cooling water circuit 1 through which the cooling water flows are shown by a solid line, and the pipes in which the cooling water does not flow are shown by a broken line. Further, the arrows overlaid on the pipe indicate the flow direction of the cooling water in the pipe. This also applies to FIGS. 4, 6 to 9 referred to in the description of the operation of the cooling water circuit 1 of the embodiment described later.

<Cooling Operation>

Figure 3:
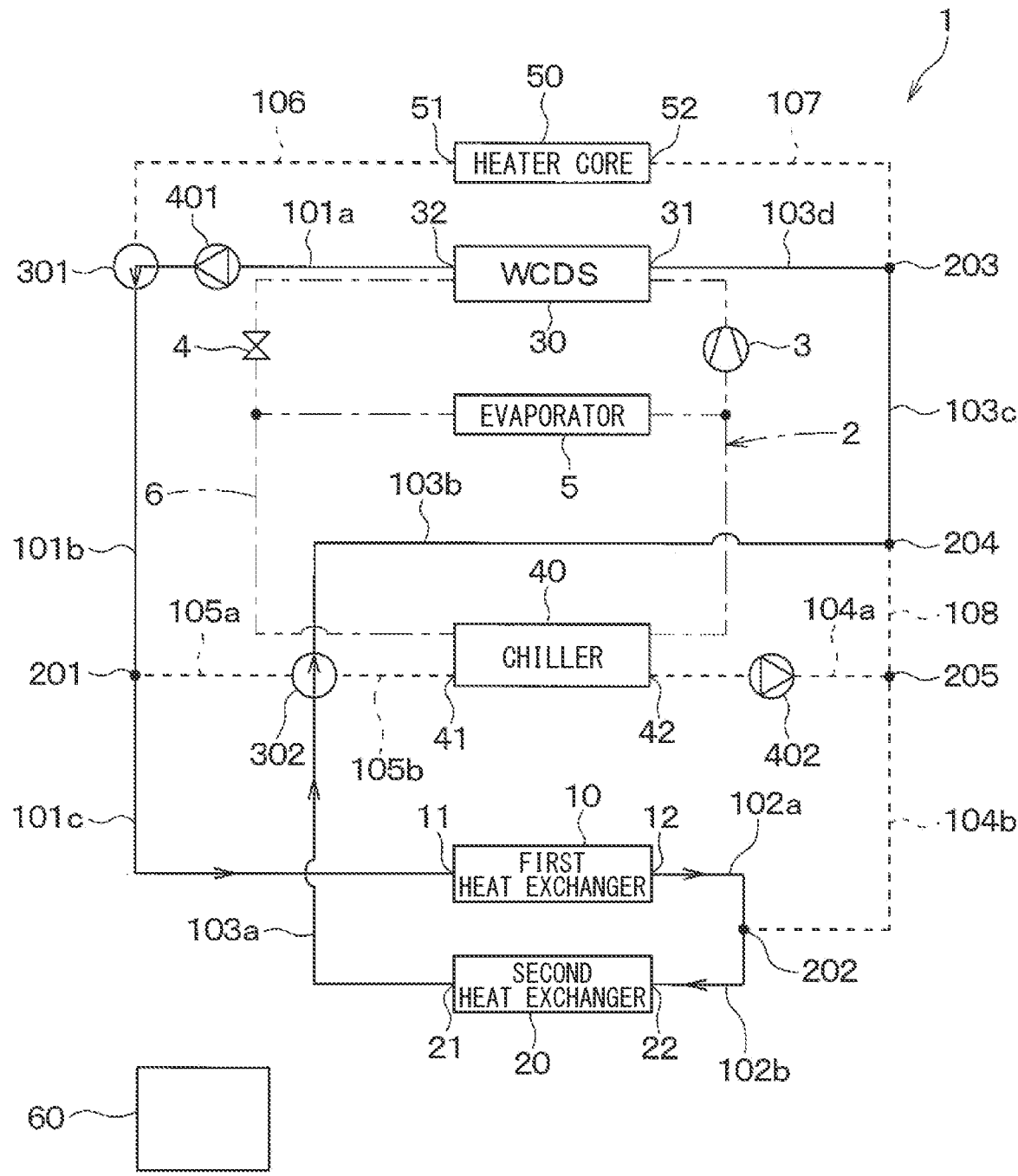
FIG. 3 is an explanatory diagram for explaining a flow of cooling water when cooling a cabin.

FIG. 3 shows the flow of cooling water when the cabin is cooled by the cooling water circuit 1 and the refrigeration cycle 2 of the first embodiment.

When the cabin is cooled, the low-pressure refrigerant flowing through the evaporator 5 of the refrigeration cycle 2 exchanges heat with air supplied to the cabin. Thus, the air cooled by the evaporator 5 is supplied to the cabin for the cooling operation. At that time, the refrigerant circulating in the refrigeration cycle 2 absorbs heat from the air by the evaporator 5, is further compressed by the compressor 3, and then dissipates heat to the cooling water circulating in the cooling water circuit 1 by the water cooling condenser 30.

The controller 60 controls each part of the cooling water circuit 1 when the sum of the amount of work that the compressor 3 of the refrigeration cycle 2 compresses the refrigerant and the amount of heat that the refrigerant flowing through the evaporator 5 absorbs heat from the air in the cabin is larger than the amount of heat required for air conditioning in the cabin. This case is an example of a case where the above-mentioned cooling operation is performed for the cabin.

Specifically, the controller 60 controls the flow path in the first valve 301 such that the cooling water flowing into the first valve 301 from the cooling water outlet 32 of the water cooling condenser 30 via the pipe 101*a* flows into the first inlet/outlet 11 of the first heat exchanger 10 via the pipes 101*b* and 101*c*. At the same time, the controller 60 controls the flow path in the first valve 301 such that the cooling water flowing into the first valve 301 from the cooling water outlet 32 of the water cooling condenser 30 via the pipe 101*a* does not flow into the heater core 50.

Further, the controller 60 controls the flow path in the second valve 302 such that the cooling water flowing into the second valve 302 from the first inlet/outlet 21 of the second heat exchanger 20 via the pipe 103*a* flows into the cooling water inlet 31 of the water cooling condenser 30 via the pipes 103*b*, 103*c*, 103*d*. At the same time, the controller 60 controls the flow path in the second valve 302 such that the cooling water flowing into the second valve 302 from the first inlet/outlet 21 of the second heat exchanger 20 via the pipe 103*a* does not flow into the chiller 40 and the pipes 101*b* and 101*c*. At this time, the second valve 302 blocks the cooling water flowing through the pipes 101*b* and 101*c* from flowing to the chiller 40 via the fifth pipe 105.

Further, the controller 60 drives at least the first water pump 401, of the two water pumps 401 and 402. As a result, the cooling water of the cooling water circuit 1 is circulated in order of the cooling water outlet 32 of the water cooling condenser 30, the pipe 101*a*, the first valve 301, the pipe 101*b*, 101*c* downstream of the first valve 301, the first heat exchanger 10, the pipe 102*a*, 102*b*, the second heat exchanger 20, the pipe 103*a*, the second valve 302, the pipe 103*b*, 103*c*, 103*d* downstream of the second valve 302, and the cooling water inlet 31 of the water cooling condenser 30. As a result, in the cooling water circuit 1, the high-temperature cooling water heated by the water cooling condenser 30 flows through the first heat exchanger 10 and the second heat exchanger 20 in series. In other words, when cooling the cabin, the controller 60 controls the drive of the valves 301 and 302 and the first water pump 401 such that the high-temperature cooling water heated by the water cooling condenser 30 flows through the first heat exchanger 10 and the second heat exchanger 20 in series.

When the cooling water flows in series through the first heat exchanger 10 and the second heat exchanger 20, the cooling water flows in order of the first inlet/outlet 11 of the first heat exchanger 10, the tubes, and the second inlet/outlet 12 in the first heat exchanger 10. Further, in the second heat exchanger 20, the cooling water flows in order of the second inlet/outlet 22, the tubes, and the first inlet/outlet 21 of the second heat exchanger 20. As a result, the high-temperature cooling water heated by the water cooling condenser 30 is cooled to some extent when flowing through the first heat exchanger 10. Further, the cooling water is further cooled when flowing through the second heat exchanger 20 to have temperature closer to the outside temperature. In this way, the cooling water flows from the first heat exchanger 10 on the downstream side in the flow direction of the outside air to the second heat exchanger 20 on the upstream side in the flow direction of the outside air, so that it is possible to increase the amount of heat radiated to the outside air from the cooling water so as to increase the capacity of cooling the cabin.

<Heating Operation>

Figure 4:
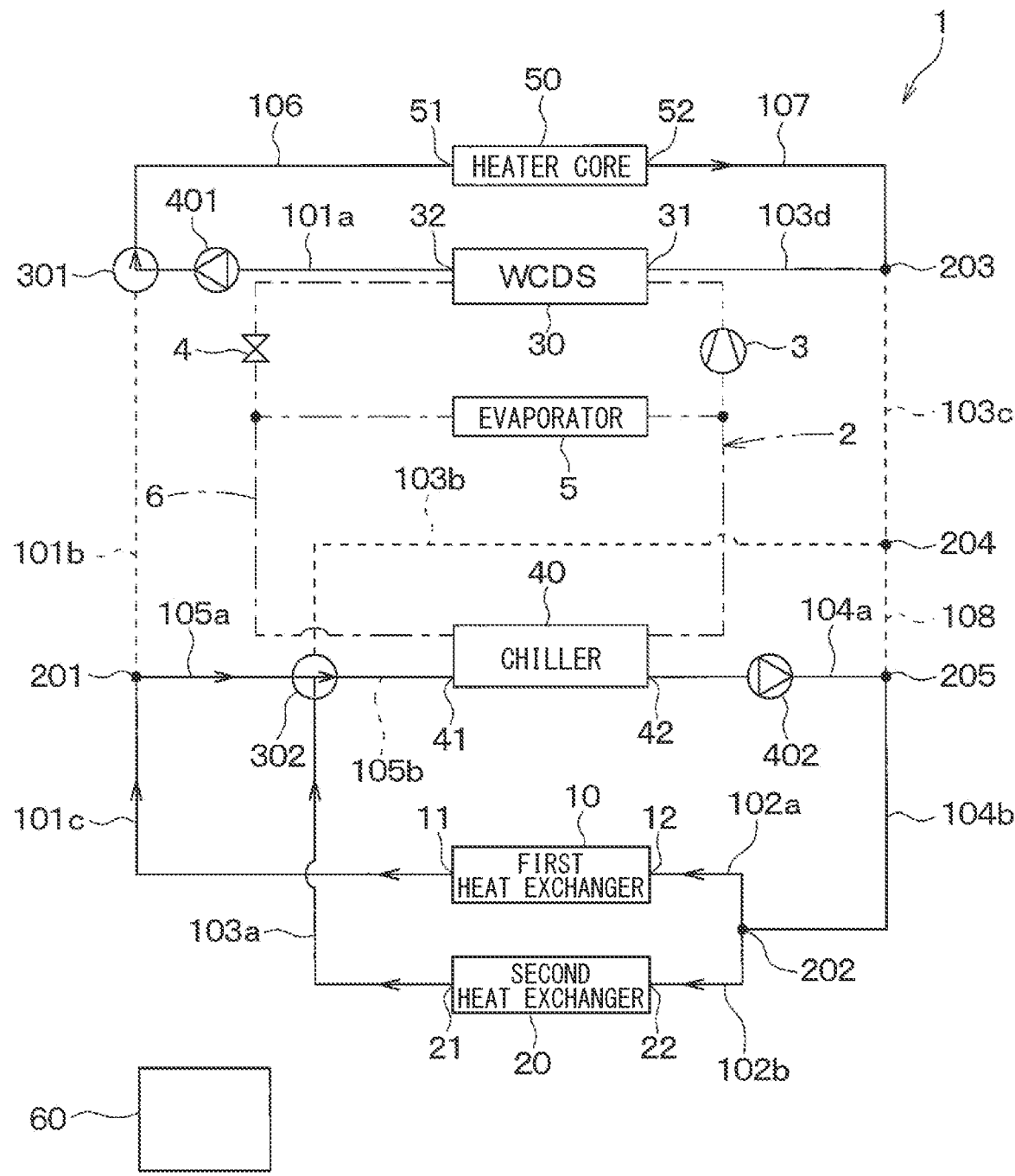
FIG. 4 is an explanatory diagram for explaining a flow of cooling water when heating a cabin.

FIG. 4 shows the flow of cooling water when the cabin is heated by the cooling water circuit 1 and the refrigeration cycle 2 of the first embodiment.

During heating of the cabin, the refrigerant circulating in the refrigeration cycle 2 absorbs heat from the cooling water at the chiller 40, is further compressed by the compressor 3, and then dissipates heat to the cooling water circulating in the cooling water circuit 1 at the water cooling condenser 30. Then, in the cooling water circuit 1, the high-temperature cooling water heated by the water cooling condenser 30 flows to the heater core 50. The heater core 50 supplies air heated by the cooling water to the cabin to heat the cabin.

The controller 60 controls each part of the cooling water circuit 1, when the sum of the amount of work that the compressor 3 of the refrigeration cycle 2 compresses the refrigerant and the amount of heat that the refrigerant flowing through the evaporator 5 absorbs from the air in the cabin is smaller than the amount of heat required for air conditioning in the cabin. This case is an example of a case where the heating and the dehumidifying heating are performed for the cabin.

Specifically, the controller 60 controls the flow path in the first valve 301 so that the cooling water flowing into the first valve 301 from the cooling water outlet 32 of the water cooling condenser 30 via the pipe 101*a* flows into the heater core 50. At the same time, the controller 60 controls the flow path in the first valve 301 such that the cooling water flowing into the first valve 301 from the cooling water outlet 32 of the water cooling condenser 30 via the pipe 101*a* does not flow into the first heat exchanger 10.

Further, the controller 60 controls the flow path in the second valve 302, such that the cooling water flowing from the second heat exchanger 20 into the second valve 302 and the cooling water flowing from the first heat exchanger 10 into the second valve 302 flow into the chiller 40. At the same time, the controller 60 controls the flow path in the second valve 302, such that the cooling water flowing from the second heat exchanger 20 into the second valve 302 and the cooling water from the first heat exchanger 10 flowing into the second valve 302 do not flow into the water cooling condenser 30.

Further, the controller 60 drives the first water pump 401 and the second water pump 402. As a result, the cooling water of the cooling water circuit 1 is circulated in order of the cooling water outlet 32 of the water cooling condenser 30, the pipe 101a, the first valve 301, the sixth pipe 106, the heater core 50, the seventh pipe 107, the third connection point 203, the pipe 103d, and the cooling water inlet 31 of the water cooling condenser 30.

Further, the cooling water of the cooling water circuit 1 is circulated in order of the cooling water outlet 42 of the chiller 40, the pipe 104a, the fifth connection point 205, the pipe 104b, the second connection point 202, the two pipes 102a and 102b, and the first heat exchanger 10 and the second heat exchanger 20. The cooling water is circulated in order of the first heat exchanger 10, the pipe 101c downstream of the first heat exchanger, the first connection point 201, the pipe 105a, and the second valve 302. The cooling water is circulated in order of the second heat exchanger 20, the pipe 103a downstream of the second heat exchanger 20, and the second valve 302. The cooling water is circulated in order of the second valve 302, the pipe 105b downstream of the second valve 302, and the cooling water inlet 41 of the chiller 40. As a result, the low-temperature cooling water cooled by the chiller 40 flows through the first heat exchanger 10 and the second heat exchanger 20 in parallel. In other words, when heating the cabin, the controller 60 controls the drive of the valves 301 and 302 and the water pumps 401 and 402 such that the low-temperature cooling water cooled by the chiller 40 flows in parallel through the first heat exchanger 10 and the second heat exchanger 20.

When the cooling water flows in parallel through the first heat exchanger 10 and the second heat exchanger 20, the cooling water flows in order of the first inlet/outlet 11, the tubes and the second inlet/outlet 12 in the first heat exchanger 10. Further, in the second heat exchanger 20, the cooling water flows in order of the second inlet/outlet 22, the tubes, and the first inlet/outlet 21. As a result, even when the temperature of the cooling water is low and the viscosity is high, the cross-sectional area of the flow path through which the cooling water flows is widened in the first heat exchanger 10 and the second heat exchanger 20. Since the flow velocity of the cooling water is reduced, it is possible to reduce the pressure loss.

The cooling water circuit 1 of the first embodiment has the following effects.

(1) In the cooling water circuit 1 of the first embodiment, when the high-temperature cooling water heated by the water cooling condenser 30 flows through the first heat exchanger 10 and the second heat exchanger 20, the first heat exchanger 10 and the second heat exchanger 20 are configured so that cooling water flows in series. As a result, it is possible to increase the amount of heat radiated from the cooling water to the outside air by lengthening the path through which the cooling water flows through the first heat exchanger 10 and the second heat exchanger 20.

Further, in the cooling water circuit 1 of the first embodiment, when the low-temperature cooling water cooled by the chiller 40 flows through the first heat exchanger 10 and the second heat exchanger 20, the first heat exchanger 10 and the second heat exchanger 20 are configured so that the cooling water flows in parallel. As a result, even when the viscosity of the cooling water is high, the pressure loss can be reduced by widening the cross-sectional area of the flow path through which the cooling water flows in the first heat exchanger 10 and the second heat exchanger 20 and reducing the flow velocity of the cooling water. Therefore, in this cooling water circuit 1, the heat exchange efficiency between the outside air and the cooling water can be raised by the first heat exchanger 10 and the second heat exchanger 20 in both the case where the high-temperature cooling water flows through the first heat exchanger 10 and the second heat exchanger 20 and the case where the low-temperature cooling water flows through the first heat exchanger 10 and the second heat exchanger 20. As a result, when the cooling water circuit 1 is used in, for example, a heat pump system for conditioning air in the cabin, its air conditioning capacity can be increased.

Further, the cooling water circuit 1 of the first embodiment can reduce the pressure loss when the low-temperature cooling water flows through the first heat exchanger 10 and the second heat exchanger 20. Since the pressure loss can be reduced, the physique of the second water pump 402 can be miniaturized.

(2) In the first embodiment, the controller 60 controls each part of the cooling water circuit 1 when the sum of the amount of work that the compressor 3 of the refrigeration cycle 2 compresses the refrigerant and the amount of heat absorbed by the low-pressure side refrigerant from the air in the cabin is larger than the amount of heat required for air conditioning, such that the cooling water of the cooling water circuit 1 flows through the first heat exchanger 10 and the second heat exchanger 20 in series. As a result, the high-temperature cooling water heated by the water cooling condenser 30 flows through the first heat exchanger 10 and the second heat exchanger 20 in series, thereby increasing the amount of heat radiated from the cooling water so as to raise the performance of cooling the cabin.

On the other hand, the controller 60 controls each part of the cooling water circuit 1 when the sum of the amount of work that the compressor 3 compresses the refrigerant circulating in the refrigeration cycle 2 and the amount of heat absorbed by the low-pressure side refrigerant from the air in the cabin is smaller than the amount of heat required for air conditioning in the cabin, so that the cooling water of the cooling water circuit 1 flows through the first heat exchanger 10 and the second heat exchanger 20 in parallel. As a result, the low-temperature cooling water cooled by the chiller 40 flows through the first heat exchanger 10 and the second heat exchanger 20 in parallel, thereby reducing the pressure loss of the cooling water. The amount of heat absorbed by the cooling water from the outside air can be increased, so that the performance of heating the cabin can be increased.

(3) In the first embodiment, when cooling the cabin, the controller 60 controls each part of the cooling water circuit 1 such that the high-temperature cooling water heated by the water cooling condenser 30 flows through the first heat exchanger 10 and the second heat exchanger 20 in series. As a result, when the cabin is cooled, the amount of heat radiated from the cooling water to the outside air in the first heat exchanger 10 and the second heat exchanger 20 can be increased, and the cabin cooling capacity can be enhanced.

On the other hand, when heating the cabin, the controller 60 controls each part of the cooling water circuit 1 such that the low-temperature cooling water cooled by the chiller 40 flows in parallel through the first heat exchanger 10 and the second heat exchanger 20. As a result, when the cabin is heated, the pressure loss of the cooling water in the first heat exchanger 10 and the second heat exchanger 20 is reduced.

Thus, the amount of heat absorbed by the cooling water from the outside air is increased, and the cabin heating capacity is enhanced.

(4) In the first embodiment, the first heat exchanger 10 and the second heat exchanger 20 are arranged in the flow direction of the outside air. As a result, the space required for mounting the first heat exchanger 10 and the second heat exchanger 20 in the hood of the vehicle can be reduced.

(5) In the first embodiment, the first heat exchanger 10 is arranged on the downstream side in the flow direction of the outside air with respect to the second heat exchanger 20. Then, when the high-temperature cooling water heated by the water cooling condenser 30 flows through the first heat exchanger 10 and the second heat exchanger 20, the cooling water flows in order of the first heat exchanger 10 and the second heat exchanger 20. As a result, the temperature of outside air passing through the second heat exchanger 20 is lower than the temperature of outside air passing through the first heat exchanger 10. Therefore, the cooling water flowing in order of the first heat exchanger 10 and the second heat exchanger 20 is cooled by the first heat exchanger 10 and then further cooled by the second heat exchanger 20. Therefore, the amount of heat radiated from the cooling water to the outside air can be increased, and the cabin cooling capacity can be enhanced.

(6) In the cooling water circuit 1 of the first embodiment, when the high-temperature cooling water heated by the water cooling condenser 30 flows through the first heat exchanger 10, the cooling water flows in order of the first inlet/outlet 11, the tubes, and the second inlet/outlet 12. On the other hand, when the low-temperature cooling water cooled by the chiller 40 flows through the second heat exchanger 20, the cooling water flows in order of the second inlet/outlet 22, the tubes, and the first inlet/outlet 21. As a result, the cooling water is allowed to flow in series or in parallel with respect to the first heat exchanger 10 and the second heat exchanger 20, by changing the flow direction of the cooling water in the first heat exchanger 10.

(7) In the first embodiment, the first heat exchanger 10 and the second heat exchanger 20 are integrally configured. As a result, the space required for mounting the first heat exchanger 10 and the second heat exchanger 20 in the hood of the vehicle can be reduced.

(8) In the first embodiment, the first valve 301 controls the flow rate of the cooling water flowing from the water cooling condenser 30 through the first heat exchanger 10 and the flow rate of the cooling water flowing from the water cooling condenser 30 through the heater core 50. The second valve 302 controls the flow rate of the cooling water flowing from the second heat exchanger 20 through the water cooling condenser 30 and the flow rate of the cooling water flowing from the second heat exchanger 20 through the chiller 40. As a result, the cooling water circuit 1 can have a simple configuration.

(9) In the first embodiment, the first water pump 401 circulates the cooling water in the path including the water cooling condenser 30. The second water pump 402 circulates the cooling water in the path including the chiller 40. As a result, the cooling water can be circulated in the cooling water circuit 1 in the state of heating the cabin and in the state of cooling the cabin.

Second Embodiment

A second embodiment will be described below. The second embodiment is different from the first embodiment in that a part of the configuration of the cooling water circuit 1 is added and changed from the first embodiment, and the other parts are the same as those of the first embodiment. Only the part different from the first embodiment will be described.

<Cooling Water Circuit>

The configuration of the cooling water circuit 1 of the second embodiment will be described.

Figure 5:
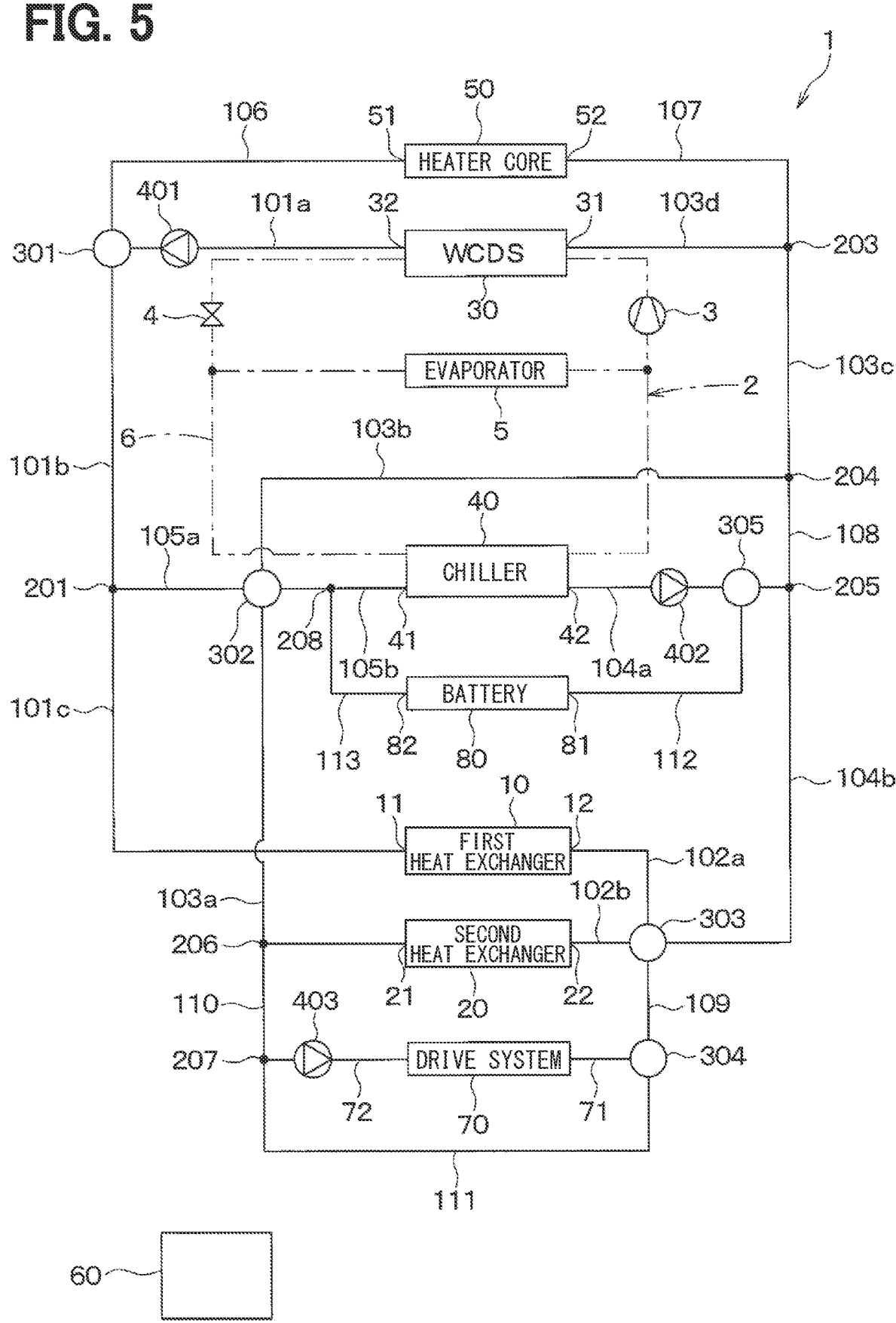
FIG. 5 is a circuit diagram showing a cooling water circuit and a refrigeration cycle according to a second embodiment.

As shown in FIG. 5, in the second embodiment, in addition to the configuration described in the first embodiment, the cooling water circuit 1 includes a drive system cooling unit 70, a first drive system valve 303, a second drive system valve 304, the ninth to thirteenth pipes 109 to 113, a battery cooling unit 80, and a battery cooling valve 305.

The drive system cooling unit 70 is a heat exchanger for cooling an equipment used for driving the vehicle (hereinafter referred to as "drive system equipment") by exchanging heat between the drive system equipment and the cooling water. Examples of the drive system equipment include a motor generator, an inverter, an advanced driver assistance system electronic control unit (ADAS ECU), and the like.

The first drive system valve 303 is a four-way valve provided at a connection point among the pipes 102*a*, 102*b*, 104*b*, and the ninth pipe 109. The second drive system valve 304 is a three-way valve provided at a connection point among one flow path 71 of the drive system cooling unit 70, the ninth pipe 109, and the eleventh pipe 111. The first drive system valve 303, the second drive system valve 304, and the ninth pipe 109 may be integrally configured.

The ninth pipe 109 connects the first drive system valve 303 and the second drive system valve 304. A sixth connection point 206 is provided in the middle of the pipe 103*a*. The other flow path 72 of the drive system cooling unit 70 and the eleventh pipe 111 are connected by a seventh connection point 207. The tenth pipe 110 connects the sixth connection point 206 and the seventh connection point 207. The eleventh pipe 111 connects the second drive system valve 304 and the seventh connection point 207. A drive system water pump 403 is provided in the middle of the other flow path 72 of the drive system cooling unit 70.

The battery cooling unit 80 is a heat exchanger for cooling the battery by exchanging heat between the battery mounted on the vehicle and the cooling water. As the battery mounted on the vehicle, for example, a lithium ion battery is used.

The battery cooling valve 305 is provided in the middle of the pipe 104*a* of the fourth pipe 104 that connects the cooling water outlet 42 of the chiller 40 and the fifth connection point 205. The battery cooling valve 305 is a three-way valve provided at a connection point between the pipe 104*a* and the twelfth pipe 112. The battery cooling valve 305 controls the flow rate of the cooling water circulating in the path including the chiller 40 and the battery cooling unit 80. The twelfth pipe 112 connects the cooling water inlet 81 of the battery cooling unit 80 and the battery cooling valve 305.

The eighth connection point 208 is provided in the middle of the pipe 105*b* of the fifth pipe 105 that connects the cooling water inlet 41 of the chiller 40 and the second valve 302. The thirteenth pipe 113 connects the cooling water outlet 82 of the battery cooling unit 80 and the eighth connection point 208.

The second water pump 402 is provided in the middle of the pipe 104*a* of the fourth pipe 104 that connects the cooling water outlet 42 of the chiller 40 and the battery cooling valve 305. That is, the second water pump 402 is provided at a position where the cooling water is circulated in the path including the chiller 40 and the battery cooling unit 80.

<Operation of Cooling Water Circuit>

Subsequently, the operation of the cooling water circuit 1 of the second embodiment will be described.

Figure 6:
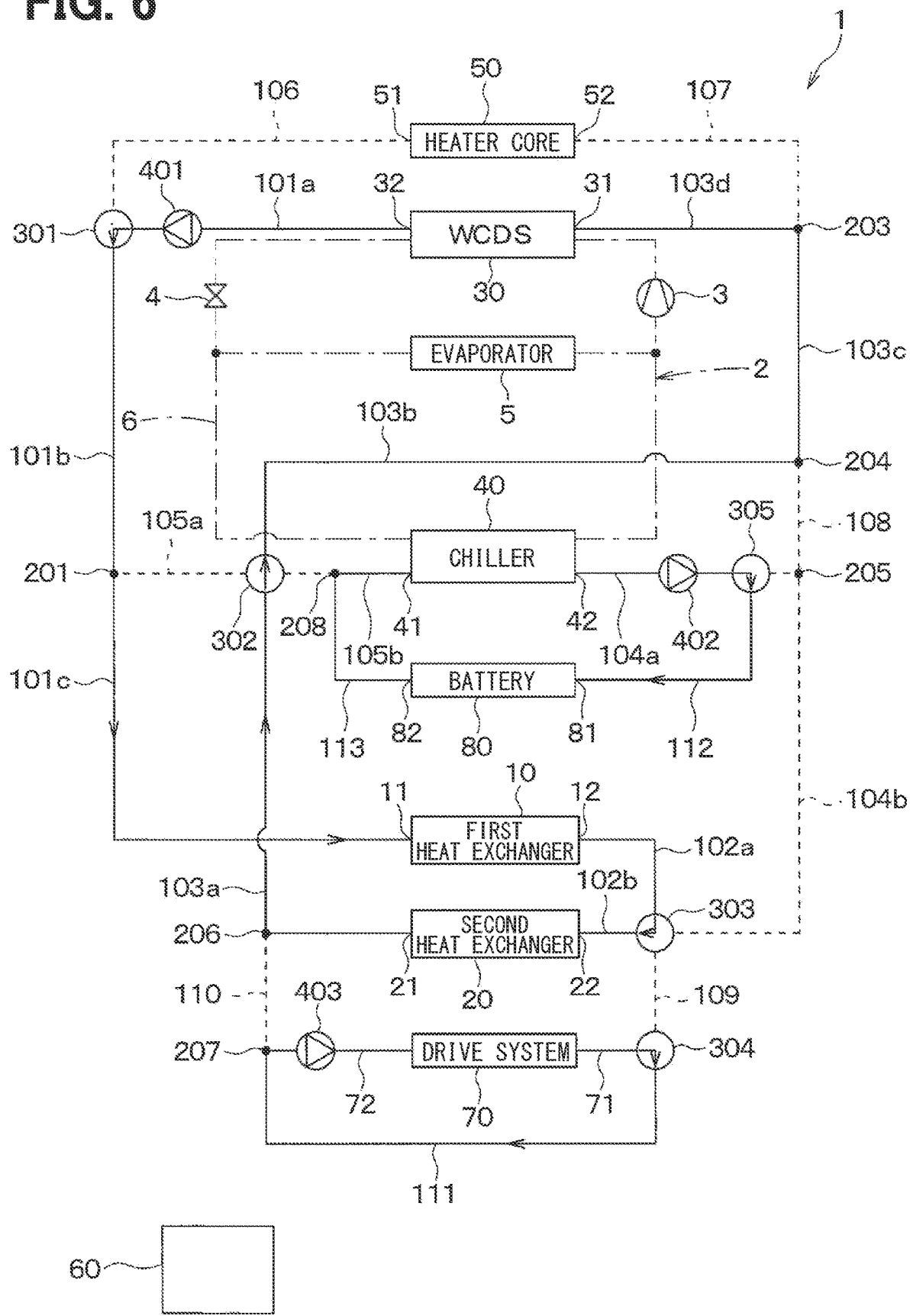
FIG. 6 is an explanatory diagram for explaining a flow of cooling water when cooling a cabin.

FIG. 6 shows the flow of cooling water when the cooling water circuit 1 and the refrigeration cycle 2 of the second embodiment cool the cabin, maintain the temperature of the drive system, and cool the battery. As shown in FIG. 6, the flow of the cooling water flowing through the first to third pipes 101 to 103 during the cooling of the cabin is the same as that described in the first embodiment. That is, the cooling water flows in series through the first heat exchanger 10 and the second heat exchanger 20.

Further, in the state shown in FIG. 6, the drive system is in a heat storage state. In the present specification, the heat storage state means that the cooling water flowing through any of the first to eighth pipes 101 to 108 flows to the first heat exchanger 10 and the second heat exchanger 20, and that the cooling water flowing through any of the ninth to eleventh pipes 109 to 111 does not flow into the first heat exchanger 10 and the second heat exchanger 20. In an electric vehicle, in case where the amount of heat generated by the drive system equipment is relatively small, when the cooling water circulates between the drive system cooling unit 70 and the eleventh pipe 111, the drive system equipment is cooled by heat radiation from the surface of the eleventh pipe 111 or the like. Therefore, the controller 60 controls the first drive system valve 303 and the second drive system valve 304 so as to achieve the heat storage state when the temperature of the cooling water flowing through the drive system cooling unit 70 or the eleventh pipe 111 is lower than a predetermined temperature threshold. At that time, the second drive system valve 304 communicates one flow path 71 of the drive system cooling unit 70 with the eleventh pipe 111. As a result, the cooling water used in the drive system circulates in the drive system cooling unit 70 and the eleventh pipe 111.

In the heat storage state, the first drive system valve 303 communicates the pipe 102*a* connected to the second inlet/outlet 12 of the first heat exchanger 10 and the pipe 102*b* connected to the second inlet/outlet 22 of the second heat exchanger 20. As a result, the cooling water used for heat dissipation to the outside air, when the cabin is cooled, flows through the first heat exchanger 10 and the second heat exchanger 20 in series.

Further, in the state shown in FIG. 6, the battery is cooled. The controller 60 drives the second water pump 402 and controls the battery cooling valve 305 and the second valve 302. The battery cooling valve 305 communicates a part of the pipe 104*a* between the chiller 40 and the fifth connection point 205 with the twelfth pipe 112. The second valve 302 blocks the cooling water flowing through a part of the pipe 105*b* between the chiller 40 and the second valve 302 from flowing to the pipes 103*a* and 103*b* and the pipes 101*b* and 101*c*. As a result, the cooling water of the cooling water circuit 1 is circulated in order of the cooling water outlet 42 of the chiller 40, the pipe 104*a*, the battery cooling valve 305, the twelfth pipe 112, the battery cooling unit 80, the thirteenth pipe 113, the pipe 105*b*, and the cooling water inlet 41 of the chiller 40. Therefore, the battery of the battery cooling unit 80 is cooled by the cooling water cooled by the chiller 40.

Figure 7:
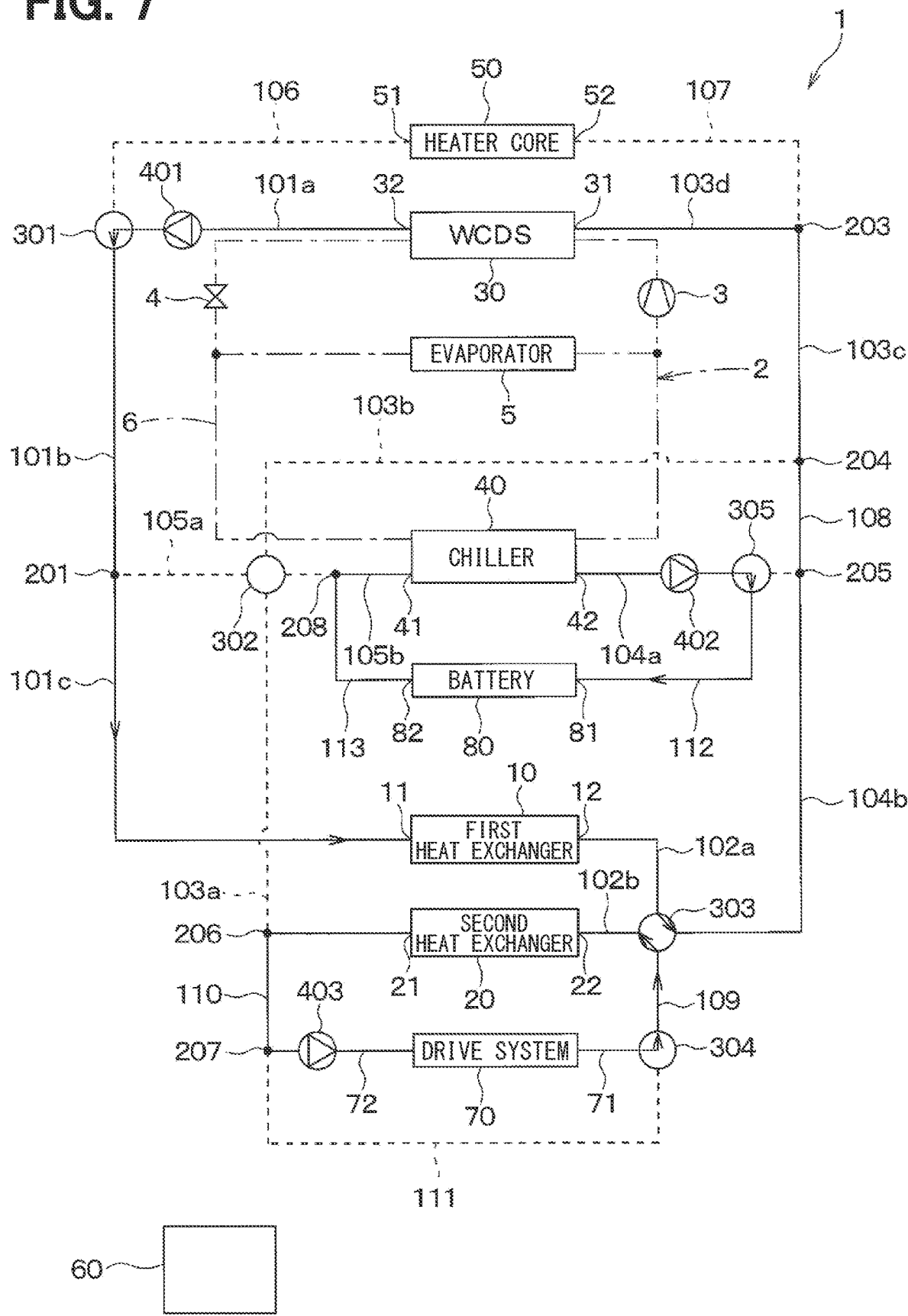
FIG. 7 is an explanatory diagram for explaining a flow of cooling water when cooling the cabin and emitting heat from a drive system.

Next, FIG. 7 shows the flow of the cooling water when the cooling water circuit 1 and the refrigeration cycle 2 of the second embodiment cool the cabin, maintain a heat dissipation state of the drive system, and cool the battery.

In the state shown in FIG. 7, the drive system is in a heat dissipation state. In the present specification, the heat dissipation state means that the cooling water flowing through any of the first to eighth pipes 101 to 108 flows to one of the first heat exchanger 10 and the second heat exchanger 20, and the cooling water flowing through any of the ninth to eleventh pipes 109 to 111 flows to the other of the first heat exchanger 10 or the second heat exchanger 20.

Even in an electric vehicle, when the load on the drive system equipment increases, the amount of heat generated may increase. Therefore, the controller 60 controls the first drive system valve 303 and the second drive system valve 304 to achieve the heat dissipation state when the temperature of the cooling water flowing through the drive system cooling unit 70 or the eleventh pipe 111 is higher than a predetermined temperature threshold. At that time, the second drive system valve 304 communicates one flow path 71 of the drive system cooling unit 70 with the ninth pipe 109. On the other hand, the first drive system valve 303 communicates the pipe 102*a* connected to the second inlet/outlet 12 of the first heat exchanger 10 with the pipe 104*b*. Further, the first drive system valve 303 communicates the pipe 102*b* connected to the second inlet/outlet 22 of the second heat exchanger 20 with the ninth pipe 109.

As a result, the cooling water used in the drive system is circulated in order of the one flow path 71 of the drive system cooling unit 70, the second drive system valve 304, the ninth pipe 109, the first drive system valve 303, the pipe 102*b*, the second heat exchanger 20, the tenth pipe 110, and the other flow path 72 of the drive system cooling unit 70. Therefore, the heat of the drive system equipment is dissipated from the second heat exchanger 20 to the outside air.

The cooling water used for cooling the cabin is circulated in order of the cooling water outlet 32 of the water cooling condenser 30, the pipe 101*a*, the first valve 301, the pipe 101*b*, 101*c* downstream of the first valve 301, the first heat exchanger 10, the pipe 102*a*, the first drive system valve 303, the pipe 104*b*, the fifth connection point 205, the eighth pipe 108, the fourth connection point 204, the pipe 103*c*, 103*d*, and the cooling water inlet 31 of the water cooling condenser 30. As a result, the heat radiated from the refrigerant to the cooling water by the water cooling condenser 30 is radiated to the outside air from the first heat exchanger 10.

Even in the state shown in FIG. 7, the battery is cooled. Since the battery cooling is the same as that shown in FIG. 6, the description thereof will be omitted.

Figure 8:
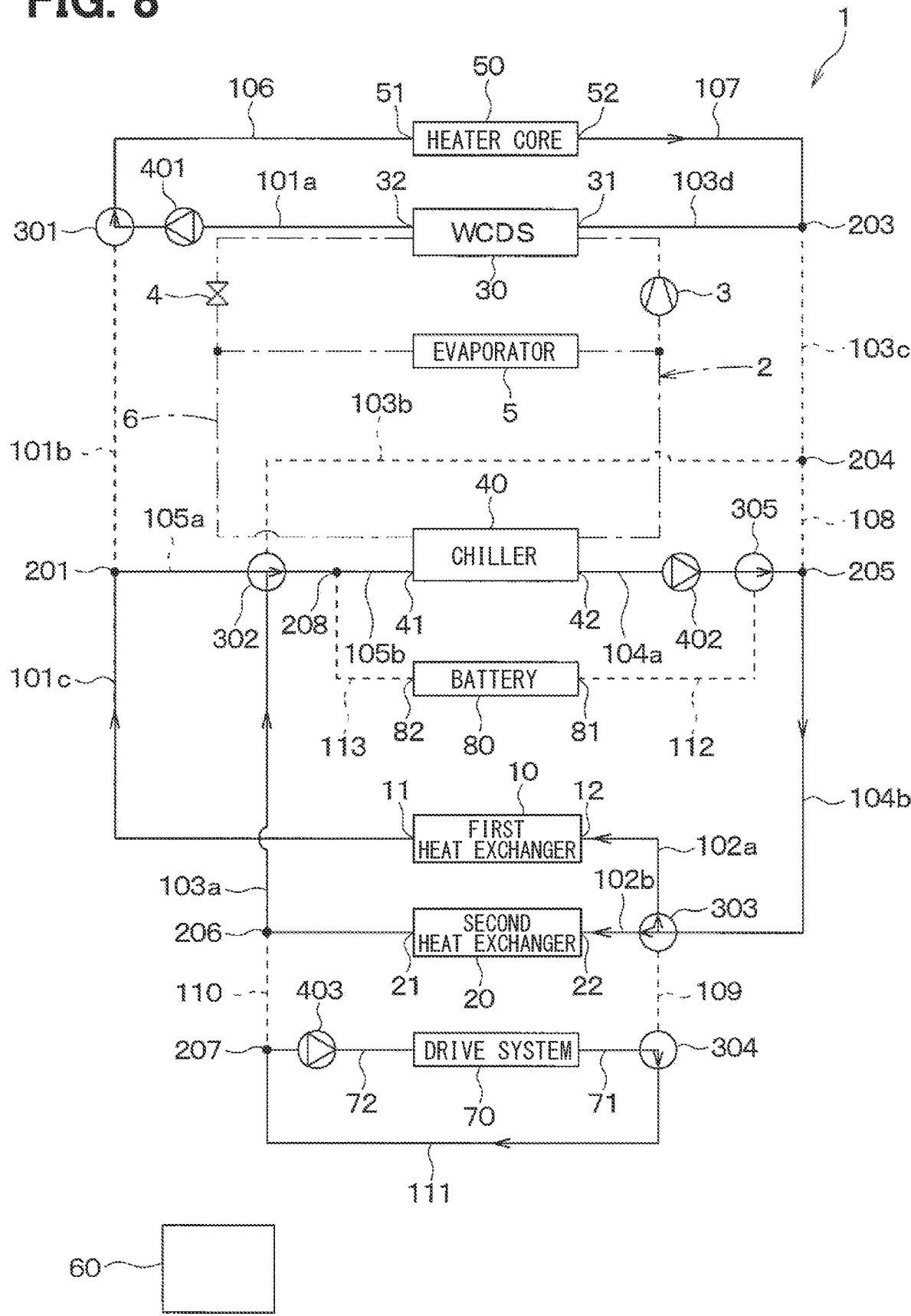
FIG. 8 is an explanatory diagram for explaining a flow of cooling water when heating a cabin.

FIG. 8 shows the flow of cooling water when the cabin is heated and the heat storage state of the drive system is maintained by the cooling water circuit 1 and the refrigeration cycle 2 of the second embodiment. As shown in FIG. 8, the flow of the cooling water flowing through the first to seventh pipes 101 to 107 during the heating of the cabin is the same as that described in the first embodiment. The first drive system valve 303 connects the pipe 104*b* to the pipe 102*a* connected to the second inlet/outlet 12 of the first heat exchanger 10 and the pipe 102*b* connected to the second inlet/outlet 22 of the second heat exchanger 20. As a result, the cooling water used for absorbing heat from the outside air, when heating the cabin, flows through the first heat exchanger 10 and the second heat exchanger 20 in parallel.

Further, in the state shown in FIG. 8, the drive system is in the heat storage state. Since the heat storage state is the same as that shown in FIG. 6, the description thereof will be omitted.

When the low-temperature cooling water flows through the first heat exchanger 10 and the second heat exchanger 20 during heating of the cabin, the first heat exchanger 10 and the second heat exchanger 20 may frost. The controller 60 can determine the presence or absence of frost based on the temperature of the first heat exchanger 10 or the second heat exchanger 20. Alternatively, the controller 60 can determine the presence or absence of frost based on the temperature or pressure of the refrigerant circulating in the refrigeration cycle 2. When the first heat exchanger 10 and the second heat exchanger 20 do not frost, the controller 60 controls the first drive system valve 303 and the second drive system valve 304 to put them in the heat storage state. As described above, in the heat storage state, the cooling water flowing through any of the first to eighth pipes 101 to 108 flows into the first heat exchanger 10 and the second heat exchanger 20, and the cooling water flowing through any of the ninth to ninth pipes 109 to 111 does not flow into the first heat exchanger 10 and the second heat exchanger 20. Therefore, when the controller 60 puts the drive system in the heat storage state, the cooling water used for absorbing heat from the outside air for heating the cabin flows through the first heat exchanger 10 and the second heat exchanger 20 in parallel.

Figure 9:
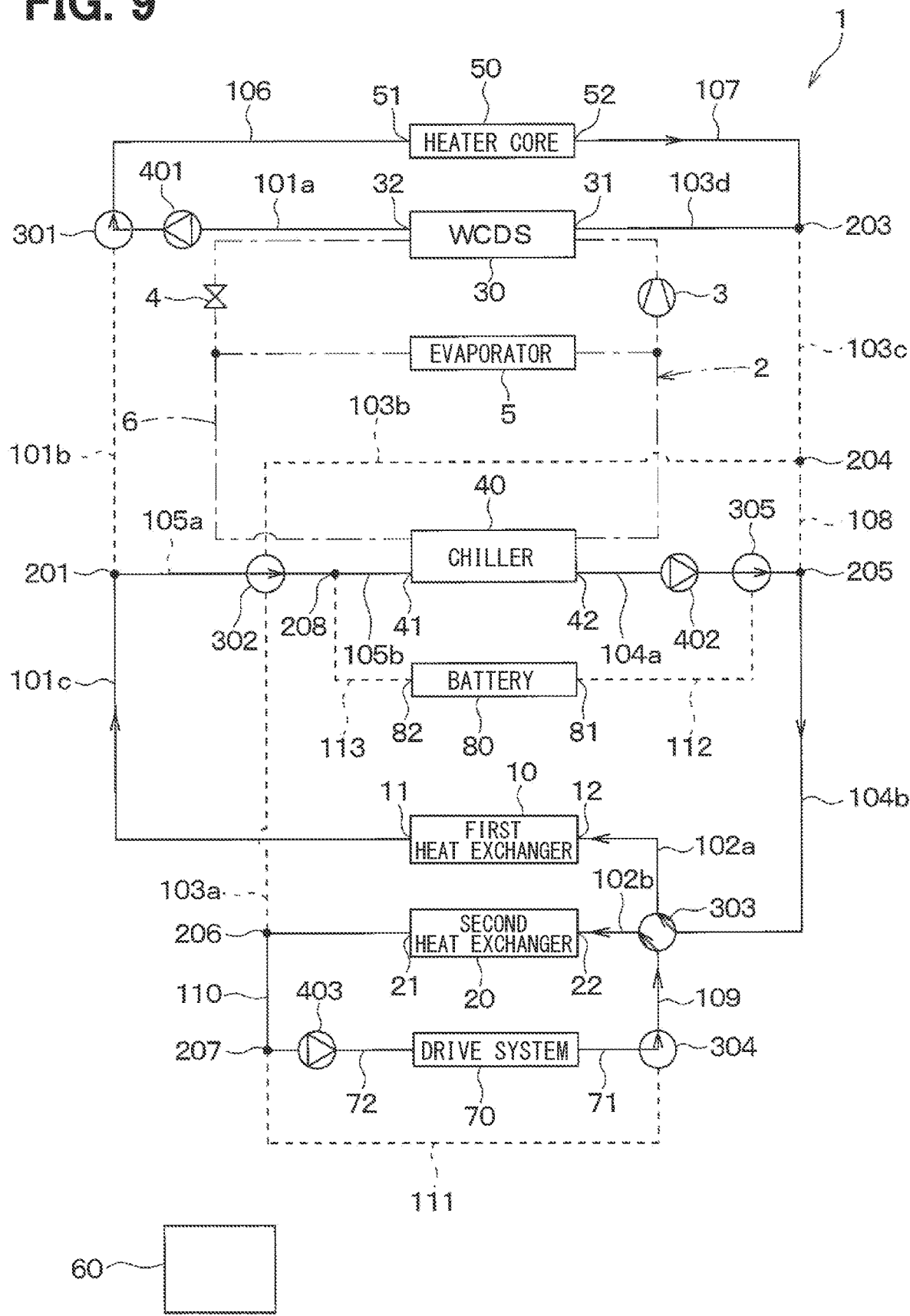
FIG. 9 is an explanatory diagram for explaining a flow of cooling water when heating the cabin and defrosting a heat exchanger.

FIG. 9 shows the flow of cooling water when the cabin is heated and the heat exchanger is defrosted by the cooling water circuit 1 and the refrigeration cycle 2 of the second embodiment.

In the state shown in FIG. 9, the drive system is in the heat dissipation state, and the second heat exchanger 20 is defrosted. As described above, the heat dissipation state means that the cooling water flowing through any of the first to eighth pipes 101 to 108 flows to one of the first heat exchanger 10 and the second heat exchanger 20, and the cooling water flowing through any of the ninth to eleventh pipes 109 to 111 flows to the other of the first heat exchanger 10 and the second heat exchanger 20.

When the first heat exchanger 10 or the second heat exchanger 20 is frosted, the controller 60 controls the first drive system valve 303 and the second drive system valve 304 to put them in the heat dissipation state. At that time, the second drive system valve 304 communicates one flow path 71 of the drive system cooling unit 70 with the ninth pipe 109. On the other hand, the first drive system valve 303 communicates the pipe 102b connected to the second inlet/outlet 22 of the second heat exchanger 20 with the ninth pipe 109. Further, the first drive system valve 303 communicates the pipe 102a connected to the second inlet/outlet 12 of the first heat exchanger 10 with the pipe 104b.

As a result, the cooling water used in the drive system is circulated in order of the one flow path 71 of the drive system cooling unit 70, the second drive system valve 304, the ninth pipe 109, the first drive system valve 303, the pipe 102b, the second heat exchanger 20, the sixth connection point 206, the tenth pipe 110, and the other flow path 72 of the drive system cooling unit 70. Therefore, in the heat dissipation state, the second heat exchanger 20 is defrosted by the heat stored in the cooling water circulating in the drive system cooling unit 70 and the eleventh pipe 111 in the heat storage state.

On the other hand, the cooling water used for absorbing heat from the outside air for heating the cabin is circulated in order of the cooling water outlet 42 of the chiller 40, the pipe 104a, the battery cooling valve 305, the pipe 104b, the first drive system valve 303, the pipe 102a, the first heat exchanger 10, the pipe 101c, the first connection point 201, the pipe 105a, the second valve 302, the pipe 105b, and the cooling water inlet 31 of the water cooling condenser 30. As a result, the low-temperature cooling water cooled by the chiller 40 absorbs heat from the outside air when flowing through the first heat exchanger 10.

The cooling water circuit 1 of the second embodiment has the following effects.

(1) The cooling water circuit 1 of the second embodiment includes the drive system cooling unit 70, the ninth to eleventh pipes 109 to 111, the first drive system valve 303, and the second drive system valve 304. The first drive system valve 303 and the second drive system valve 304 are configured to switch the heat storage state and the heat dissipation state from each other. As a result, the temperature of the drive system equipment can be adjusted. Further, when the first heat exchanger 10 or the second heat exchanger 20 is frosted, the first heat exchanger 10 and the second heat exchanger 20 can be defrosted by the heat stored in the cooling water circulating in the drive system cooling unit 70 and the eleventh pipe 111.

(2) In the second embodiment, the controller 60 controls the first drive system valve 303 and the second drive system valve 304 to achieve the heat storage state when the temperature of the cooling water flowing through the drive system cooling unit 70 or the eleventh pipe 111 is lower than a predetermined temperature threshold. Further, when the temperature of the cooling water flowing through the drive system cooling unit 70 or the eleventh pipe 111 is higher than a predetermined temperature threshold, the controller 60 controls the first drive system valve 303 and the second drive system valve 304 to achieve the heat dissipation state. As a result, the cooling water circuit 1 can adjust the temperature of the drive system equipment.

(3) In the second embodiment, the controller 60 controls the first drive system valve 303 and the second drive system valve 304 to achieve the heat storage state when the first heat exchanger 10 or the second heat exchanger 20 does not frost. Further, when the first heat exchanger 10 or the second heat exchanger 20 is frosted, the controller 60 controls the first drive system valve 303 and the second drive system valve 304 to put them in the heat dissipation state. As a result, when the first heat exchanger 10 or the second heat exchanger 20 is frosted, the first heat exchanger 10 and the second heat exchanger 20 can be defrosted by the heat stored in the cooling water circulating in the drive system cooling unit 70 and the eleventh pipe 111 in the heat storage state.

(4) The cooling water circuit 1 of the second embodiment includes the battery cooling unit 80, the twelfth pipe 112, the thirteenth pipe 113, and the battery cooling valve 305. The second water pump 402 is provided at a position where the cooling water is circulated in the path including the chiller 40 and the battery cooling unit 80. As a result, the cooling water circuit 1 can control the temperature of the battery mounted on the vehicle.

Third Embodiment

A third embodiment will be described below. The third embodiment is a modification of the second embodiment in which a part of the valve configuration is modified, and the other parts are the same as those of the second embodiment. Therefore, only the parts different from the second embodiment will be described.

In the second embodiment, the battery cooling valve 305 is provided in the middle of the pipe 104a.

Figure 10:
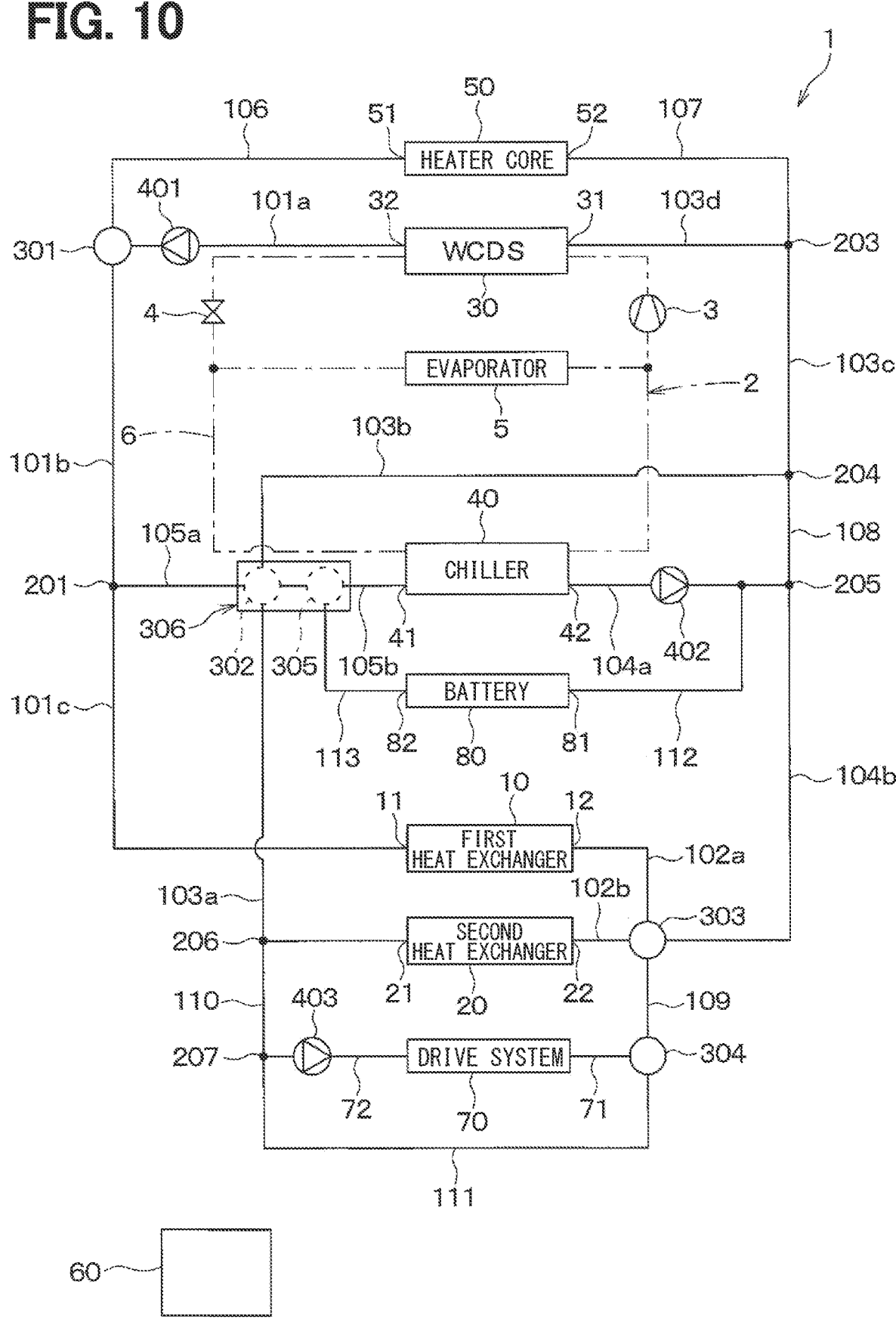
FIG. 10 is a circuit diagram showing a cooling water circuit and a refrigeration cycle according to a third embodiment.

As shown in FIG. 10, in the third embodiment, the battery cooling valve 305 and the second valve 302 are integrally formed as a five-way valve 306. The five-way valve 306 is provided at a connection point among the pipe 105a, 105b, 103a, 103b and the thirteenth pipe 113. Thereby, it is possible to simplify the configuration of the cooling water circuit 1 in the third embodiment.

Fourth Embodiment

A fourth embodiment will be described. The fourth embodiment is also a modification of the second embodiment in which a part of the valve configuration is modified, and the other parts are the same as those of the second embodiment. Therefore, only the parts different from the second embodiment will be described.

Figure 11:
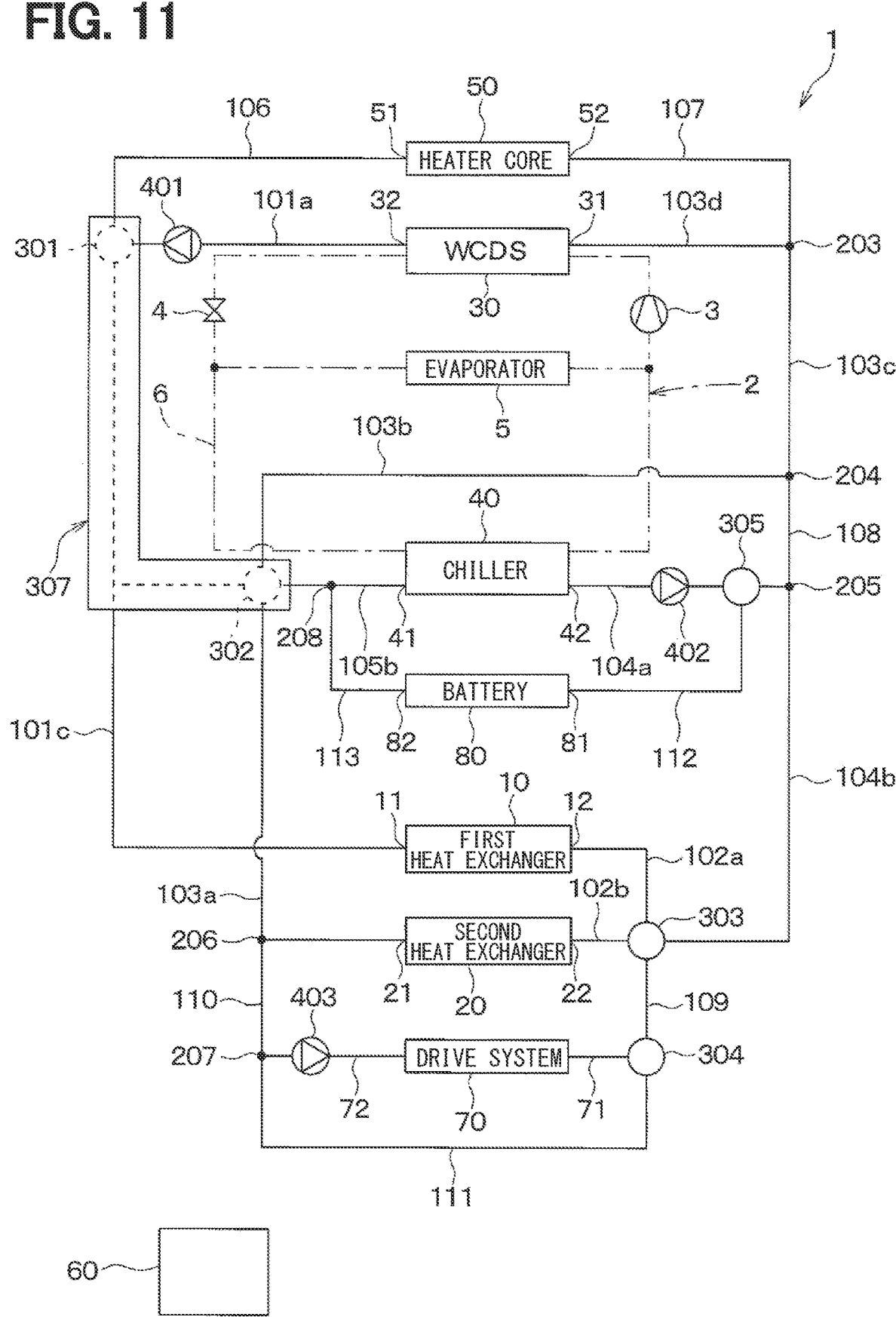
FIG. 11 is a circuit diagram showing a cooling water circuit and a refrigeration cycle according to a fourth embodiment.

As shown in FIG. 11, in the fourth embodiment, the first valve 301 and the second valve 302 are integrally formed as a hexagonal valve 307. The hexagonal valve 307 is provided at a connection point among the pipe 101a, 101c, 103a, 103b, 105b, and the sixth pipe 106. Thereby, in the fourth embodiment, it is possible to simplify the configuration of the cooling water circuit 1.

Fifth Embodiment

A fifth embodiment will be described. The fifth embodiment is also a modification of the second embodiment in which a part of the valve configuration is modified, and the other parts are the same as those of the second embodiment. Therefore, only the parts different from the second embodiment will be described.

Figure 12:
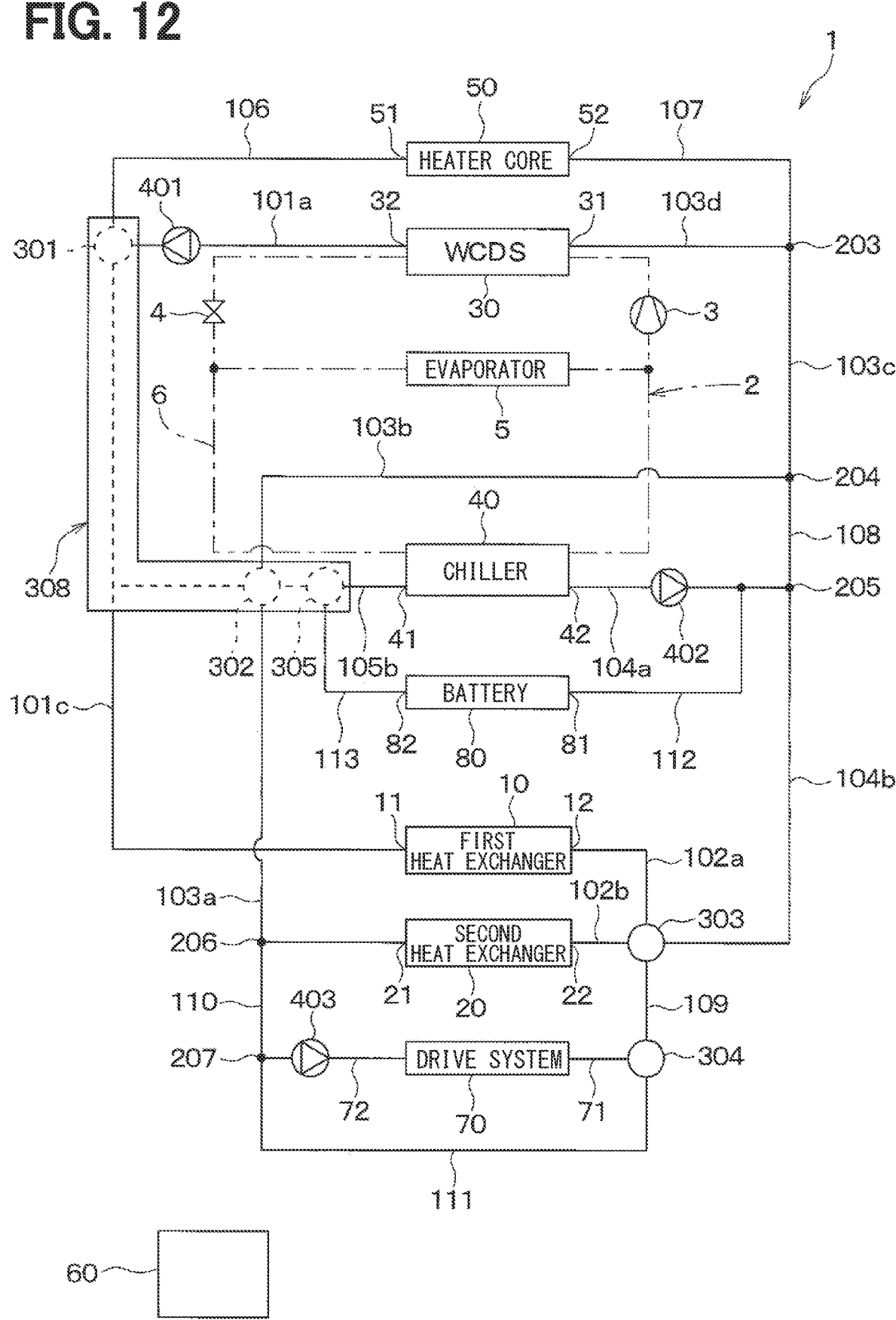
FIG. 12 is a circuit diagram showing a cooling water circuit and a refrigeration cycle according to a fifth embodiment.

As shown in FIG. 12, in the fifth embodiment, the first valve 301, the second valve 302, and the battery cooling valve 305 are integrally configured as a seven-way valve 308. The seven-way valve 308 is provided at a connection point among the pipe 101a, 101c, 103a, 103b, 105b, the sixth pipe 106, and the thirteenth pipe 113. Thereby, in the fifth embodiment, it is possible to simplify the configuration of the cooling water circuit 1.

Sixth Embodiment

A sixth embodiment will be described. In the sixth embodiment, the arrangement of the water pumps 401 and 402 is modified with respect to the second embodiment, and the other parts are the same as those in the second embodiment. Therefore, only the parts different from the second embodiment will be described.

In the second embodiment, the first water pump 401 is provided in the middle of the pipe 101a of the first pipe 101 that connects the cooling water outlet 32 of the water cooling condenser 30 and the first valve 301.

Figure 13:
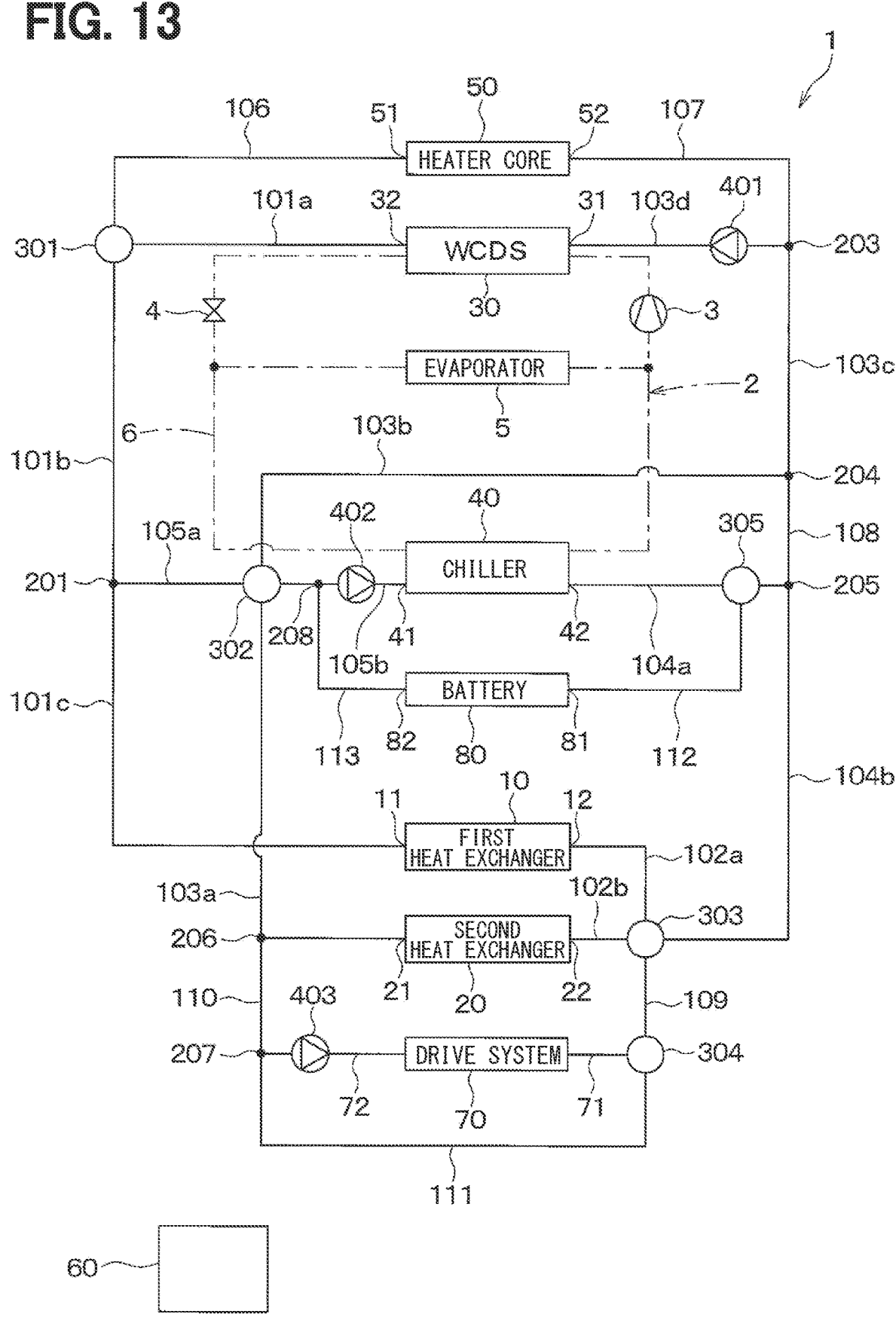
FIG. 13 is a circuit diagram showing a cooling water circuit and a refrigeration cycle according to a sixth embodiment.

As shown in FIG. 13, in the sixth embodiment, the first water pump 401 is provided in the middle of the pipe 103d of the third pipe 103 that connects the cooling water inlet 31 of the water cooling condenser 30 and the third connection point 203. Even at this position, the first water pump 401 can circulate the cooling water in the path including the water cooling condenser 30 and the heater core 50.

In the second embodiment, the second water pump 402 is provided in the middle of the pipe 104a of the fourth pipe 104 that connects the cooling water outlet 42 of the chiller 40 and the fifth connection point 205.

As shown in FIG. 13, in the sixth embodiment, the second water pump 402 is provided in the middle of the pipe 105b of the fifth pipe 105 that connects the cooling water inlet 41 of the chiller 40 and the eighth connection point 208. Even at this position, the second water pump 402 can circulate the cooling water in the path including the chiller 40 and the battery cooling unit 80. Therefore, the cooling water circuit 1 of the sixth embodiment can also have the same effect as that of the second embodiment.

Seventh Embodiment

A seventh embodiment will be described. In the seventh embodiment, a part of the piping is changed with respect to the first embodiment, and the other parts are similar to that in the first embodiment, so only the difference from the first embodiment will be described.

In the first to sixth embodiments, the eighth pipe 108 connecting the third pipe 103 and the fourth pipe 104 is provided.

Figure 14:
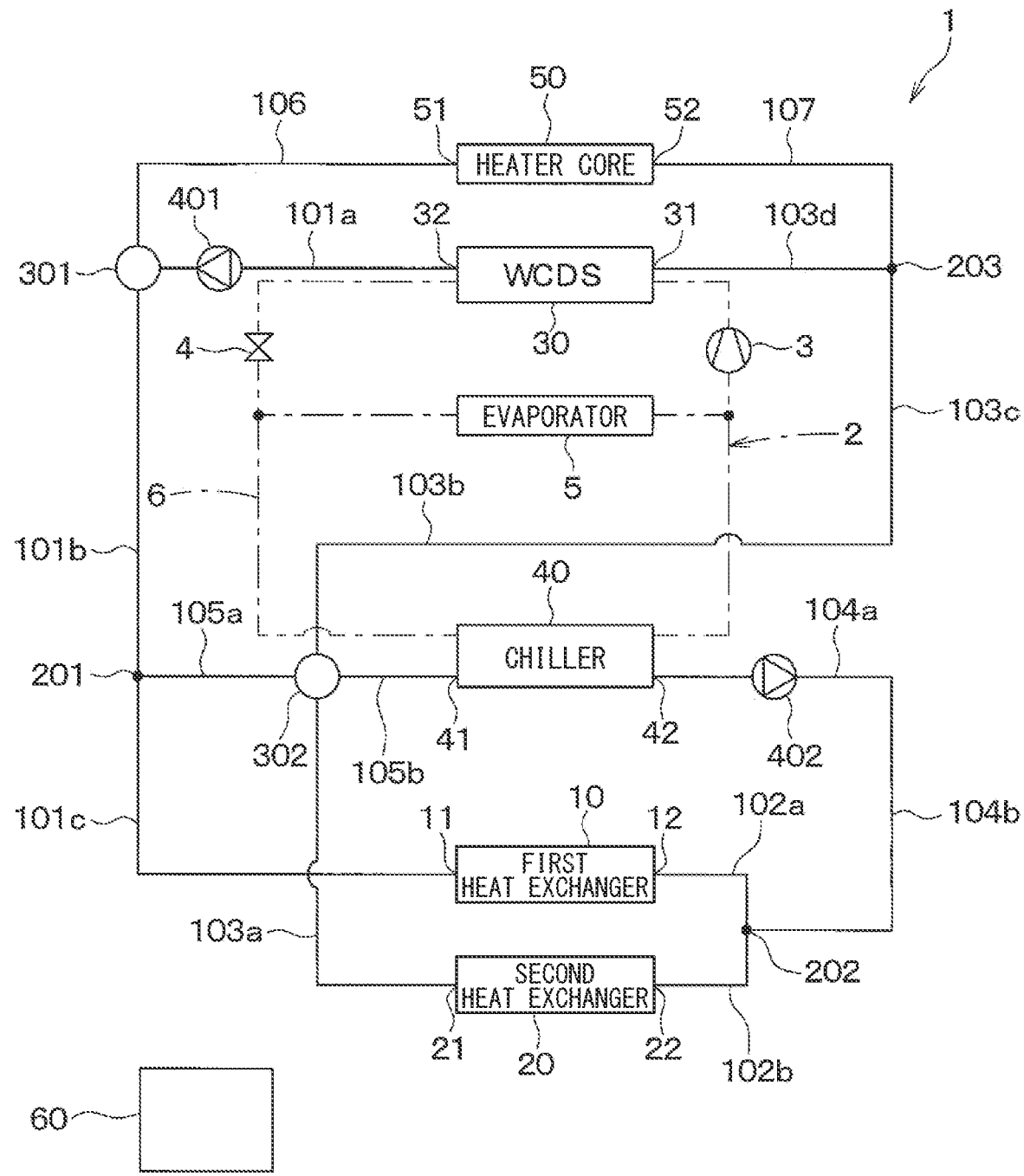
FIG. 14 is a circuit diagram showing a cooling water circuit and a refrigeration cycle according to a seventh embodiment.

As shown in FIG. 14, in the seventh embodiment, the eighth pipe 108 is not provided. In the seventh embodiment, the same effects as those in the first to sixth embodiments can be obtained except for simultaneously keeping the heat dissipation state of the drive system and performing the cooling operation for the cabin.

Eighth Embodiment

An eighth embodiment will be described hereafter. The eighth embodiment is a modification of the first embodiment in which a part of the valve configuration is modified, and the other parts are the same as those of the first embodiment, so only the difference from the first embodiment will be described.

In the first to sixth embodiments, the first valve 301 is provided at the connection point among the pipe 101a, 101b and the sixth pipe 106.

Figure 15:
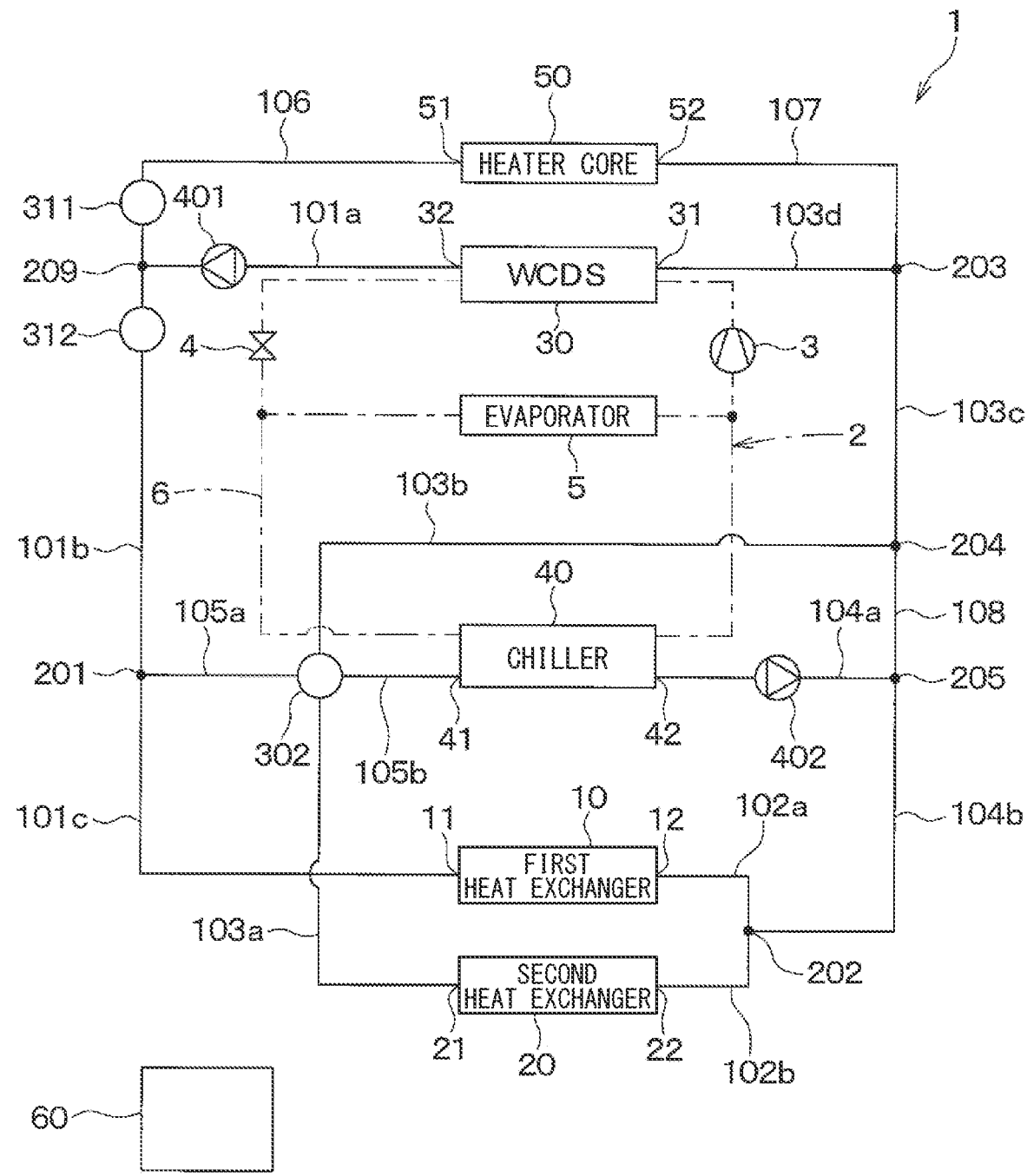
FIG. 15 is a circuit diagram showing a cooling water circuit and a refrigeration cycle according to an eighth embodiment.

As shown in FIG. 15, in the eighth embodiment, the first control valve 311 and the second control valve 312 are provided in place of the first valve 301. A ninth connection point 209 is provided at a connection point among the pipe 101a, 101b and the sixth pipe 106.

The first control valve 311 is provided in the middle of the sixth pipe 106. The second control valve 312 is provided in the pipe 101b of the first pipe 101 between the ninth connection point 209 and the first connection point 201. Each of the first control valve 311 and the second control valve 312 is a flow rate control valve that controls the flow of cooling water, or an on-off valve that opens and closes the flow path. The cooling water circuit 1 of the eighth embodiment can also exhibit the same effects as those of the first embodiment and the like.

Other Embodiments

The present disclosure is not limited to the embodiments described above, and can be modified as appropriate. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Also, the shape, the positional relationship, and the like of the component or the like mentioned in the above embodiments are not limited to those being mentioned unless otherwise specified, limited to the specific shape, positional relationship, and the like in principle, or the like.

The controller 60 and its method according to the above embodiment are provided by a dedicated computer provided by configuring a processor and memory programmed to perform one or more functions embodied by a computer program. Alternatively, the controller 60 and its method according to the above embodiment may be realized by a dedicated computer provided by configuring the processor with one or more dedicated hardware logic circuits. Alternatively, the controller 60 and its method according to the above embodiment may be realized by one or more dedicated computers configured by a combination of a processor and memory programmed to perform one or more functions and a processor composed of one or more hardware logic circuits. The computer readable program may be stored, as instructions to be executed by a computer, in the memory which is a tangible non-transitory computer-readable medium.

(1) In each of the embodiments, the external heat medium that heats the cooling water flowing through the heat-radiating heat exchanger is a high-pressure side refrigerant that circulates in the refrigeration cycle 2, but is not limited to this. The external heat medium that heats the cooling water flowing through the heat-radiating heat exchanger may be various heat generating devices mounted on the vehicle.

(2) In each of the embodiments, the external heat medium that cools the cooling water flowing through the heat-absorbing heat exchanger is a low-pressure side refrigerant that circulates in the refrigeration cycle 2, but is not limited to this. The external heat medium that heats the cooling water flowing through the heat-absorbing heat exchanger may be various cooling devices mounted on the vehicle.

(3) In each of the embodiments, the first heat exchanger 10 and the second heat exchanger 20 are configured as one integrated module, but is not limited to this. The first heat exchanger 10 and the second heat exchanger 20 may be configured separately.

(4) In each of the embodiments, the air supplied to the cabin is cooled by the evaporator 5 in the refrigeration cycle 2 when the cabin is cooled, but is not limited to this. Instead of the evaporator 5, or together with the evaporator 5, the air supplied to the cabin may be cooled by using the cold heat of the cooling water cooled by the chiller 40. Therefore, in the refrigeration cycle 2, at least one of the evaporator 5 and the chiller 40 can be used as a device for cooling the air in the cabin.

(5) In each of the embodiments, the cooling water circuit 1 performs the cooling operation and the heating operation for the cabin, but is not limited to this.

The cooling water circuit 1 can also dehumidify air for the cabin or dehumidify and heat air for the cabin by using both the evaporator 5 or the chiller 40 and the water cooling condenser 30. Even in that case, the controller 60 controls the valves 301 and 302 so that the cooling water heated by the water cooling condenser 30 flows through the first heat exchanger 10 and the second heat exchanger 20 when the sum of the amount of work that the compressor 3 of the refrigeration cycle 2 compresses the refrigerant and the amount of heat absorbed by the low-pressure side refrigerant from the air in the cabin is larger than the amount of heat required for air conditioning in the cabin. As a result, heat is dissipated from the cooling water to the outside air in the first heat exchanger 10 and the second heat exchanger 20.

Further, the controller 60 controls the valves 301 and 302 so that the cooling water cooled by the chiller 40 flows through the first heat exchanger 10 and the second heat exchanger 20, when the sum of the amount of work that the compressor 3 of the refrigeration cycle 2 compresses the refrigerant and the amount of heat absorbed by the low-pressure side refrigerant from the air in the cabin is smaller than the amount of heat required for air conditioning in the cabin. As a result, heat is absorbed from the outside air into the cooling water in the first heat exchanger 10 and the second heat exchanger 20.

(6) In the cooling water circuit 1, valves, water pumps, and the like can be added as needed. Further, it is possible to appropriately change one valve to be composed of a plurality of valves or to change a plurality of valves to be composed of one valve.

(Overview)

According to the first aspect shown in part or all of the embodiments, the cooling water circuit through which the high-temperature cooling water and the low-temperature cooling water flow includes a heat-radiating heat exchanger, a heat-absorbing heat exchanger, a first heat exchanger and a second heat exchanger. In the heat-radiating heat exchanger, the cooling water is heated by the heat radiated from the external heat medium. In the heat-absorbing heat exchanger, the cooling water is cooled by the heat absorption of the external heat medium. The first heat exchanger and the second heat exchanger exchange heat between the cooling water and the outside air. In this cooling water circuit, when the high-temperature cooling water heated by the heat-radiating heat exchanger flows through the first heat exchanger and the second heat exchanger, the cooling water flows through the first heat exchanger and the second heat exchanger in series. Further, in the cooling water circuit, when the low-temperature cooling water cooled by the heat-absorbing heat exchanger flows through the first heat exchanger and the second heat exchanger, the cooling water flows through the first heat exchanger and the second heat exchanger in parallel.

According to the second aspect, the cooling water circuit is used together with the refrigeration cycle. The heat-radiating heat exchanger is a water cooling condenser in which the cooling water is heated by the heat radiation of the refrigerant on the high-pressure side that circulates in the refrigeration cycle. The heat-absorbing heat exchanger is a chiller in which the cooling water is cooled by the heat absorption of the refrigerant on the low-pressure side that circulates in the refrigeration cycle.

Accordingly, it is possible to condition air for a cabin of an electric vehicle and control the temperature of an in-vehicle device by using the cooling water circuit together with the refrigeration cycle.

According to the third aspect, the cooling water circuit is used for air conditioning in the cabin. The cooling water circuit includes a controller that controls the drive of each part of the circuit, when the sum of the amount of work that the compressor of the refrigeration cycle compresses the refrigerant circulating in the refrigeration cycle and the amount of heat that the low-pressure side refrigerant that flows through the refrigeration cycle absorbs from the air in the cabin is larger than the amount of heat required for the air conditioning, such that the high-temperature cooling water heated by the water cooling condenser is controlled to flow in series between the first heat exchanger and the second heat exchanger.

When the sum of the amount of work that the compressor compresses the refrigerant that circulates in the refrigeration cycle and the amount of heat that the low-pressure side refrigerant that flows through the refrigeration cycle absorbs from the air in the cabin is smaller than the amount of heat required for air conditioning, the controller controls such that the low-temperature cooling water cooled by the chiller flows in parallel between the first heat exchanger and the second heat exchanger.

Accordingly, the high-temperature cooling water flows through the first heat exchanger and the second heat exchanger in series, so that the amount of heat radiated from the cooling water to the outside air can be increased and the cabin cooling capacity can be enhanced.

On the other hand, the low-temperature cooling water flows in parallel through the first heat exchanger and the second heat exchanger to reduce the pressure loss of the cooling water. The amount of heat absorbed by the cooling water from the outside air is increased so as to increase the heating capacity of the cabin.

According to the fourth aspect, when cooling the cabin, the controller controls so that the high-temperature cooling water heated by the water cooling condenser flows through the first heat exchanger and the second heat exchanger in series. On the other hand, when heating the cabin, the controller controls so that the low-temperature cooling water cooled by the chiller flows in parallel between the first heat exchanger and the second heat exchanger.

Accordingly, when the cabin is cooled, the amount of heat radiated from the cooling water to the outside air can be increased, so as to raise the cabin cooling capacity. On the other hand, when the cabin is heated, the pressure loss of the cooling water can be reduced. Thus, the amount of heat absorbed by the cooling water from the outside air can be increased, and the cabin heating capacity can be increased.

According to the fifth aspect, the first heat exchanger and the second heat exchanger are arranged in the flow direction of the outside air. Accordingly, the space required for mounting the first heat exchanger and the second heat exchanger can be reduced in the hood of the vehicle.

According to the sixth aspect, the first heat exchanger is arranged on the downstream side in the flow direction of the outside air with respect to the second heat exchanger. Then, when the high-temperature cooling water heated by the heat-radiating heat exchanger flows through the first heat exchanger and the second heat exchanger, the cooling water flows in order of the first heat exchanger and the second heat exchanger.

Accordingly, regarding the outside air passing through the two heat exchangers, the temperature of the outside air passing through the second heat exchanger is lower than the temperature of the outside air passing through the first heat exchanger. Therefore, the cooling water flowing in order of the first heat exchanger and the second heat exchanger is cooled by the first heat exchanger and then further cooled by the second heat exchanger. Therefore, the amount of heat radiated from the cooling water to the outside air can be increased, and the cabin cooling capacity can be enhanced.

According to the seventh aspect, the first heat exchanger has the first inlet/outlet, the plurality of tubes, and the second inlet/outlet, through which the cooling water flows in this order. When the high-temperature cooling water heated by the heat-radiating heat exchanger flows through the first heat exchanger, the cooling water flows in the order of the first inlet/outlet, the plurality of tubes, and the second inlet/outlet. On the other hand, when the low-temperature cooling water cooled by the heat-absorbing heat exchanger flows through the first heat exchanger, the cooling water flows in order of the second inlet/outlet, the plurality of tubes, and the first inlet/outlet.

Accordingly, it is possible to create a state in which the cooling water flows in series and a state in which the cooling water flows in parallel, relative to the first heat exchanger and the second heat exchanger by changing the flow direction of the cooling water in the first heat exchanger.

According to the eighth aspect, the first heat exchanger and the second heat exchanger are integrally configured. Accordingly, the space required for mounting the first heat exchanger and the second heat exchanger can be reduced in the hood of the vehicle.

According to the ninth aspect, the cooling water circuit further includes the first to fifth pipes, a water pump and a valve. The first pipe connects the heat-radiating heat exchanger and the first heat exchanger. The second pipe connects the first heat exchanger and the second heat exchanger. The third pipe connects the second heat exchanger and the heat-radiating heat exchanger. The fourth pipe connects the heat-absorbing heat exchanger and the second pipe. The fifth pipe connects the first pipe, the third pipe, and the heat-absorbing heat exchanger. The water pump is configured to circulate the cooling water in the cooling water circuit. The valve controls a flow rate of the cooling water flowing through the heat-radiating heat exchanger and a flow rate of the cooling water flowing through the heat-absorbing heat exchanger in the cooling water circuit.

Accordingly, the cooling water heated by the heat-radiating heat exchanger flows through the first heat exchanger and the second heat exchanger in series, and the cooling water cooled by the heat-absorbing heat exchanger flows through the first heat exchanger and the second heat exchanger in parallel.

According to the tenth aspect, the cooling water circuit further includes a heater core, a sixth pipe, and a seventh pipe. The heater core exchanges heat between air supplied to the cabin and the cooling water. The sixth pipe connects the heater core and the first pipe. The seventh pipe connects the heater core and the third pipe. Accordingly, the cooling water circuit can heat air for the cabin by the heater core.

According to the eleventh aspect, the valve includes a first valve and a second valve. The first valve controls the flow rate of the cooling water flowing through the heat-radiating heat exchanger to the first heat exchanger and the flow rate of the cooling water flowing through the heat-radiating heat exchanger to the heater core. The second valve controls the flow rate of the cooling water flowing through the second heat exchanger to the heat-radiating heat exchanger and the flow rate of the cooling water flowing through the second heat exchanger to the heat-absorbing heat exchanger.

The water pump includes a first water pump and a second water pump. The first water pump circulates the cooling water in a path including the heat-radiating heat exchanger. The second water pump circulates the cooling water in a path including the heat-absorbing heat exchanger.

Accordingly, the cooling water circuit can be switched between the state of heating the cabin and the state of cooling the cabin by the first valve and the second valve. Then, the first water pump and the second water pump can circulate the cooling water in the cooling water circuit in both the heating state and the cooling state.

According to the twelfth aspect, the cooling water circuit further includes a drive system cooling unit, eighth to eleventh pipes, a first drive system valve and a second drive system valve. The eighth pipe connects the third pipe and the fourth pipe. The ninth pipe connects one flow path of the drive system cooling unit to the first drive system valve. The tenth pipe connects the other flow path of the drive system cooling unit to the third pipe. The eleventh pipe connects the one flow path of the drive system cooling unit and the other flow path of the drive system cooling unit. The first drive system valve is provided at a connection point among the second pipe, the fourth pipe, and the ninth pipe. The second drive system valve is provided at a connection point among the one flow path of the drive system cooling unit, the ninth pipe and the eleventh pipe.

A heat storage state is defined when the cooling water flowing through any of the first to eighth pipes flows to the first heat exchanger and the second heat exchanger, and the cooling water flowing through any of the ninth to eleventh pipes does not flow to the first heat exchanger and the second heat exchanger. Further, a heat dissipation state is defined when the cooling water flowing through any of the first to eighth pipes flows to either the first heat exchanger or the second heat exchanger, and the cooling water flowing through any of the ninth to eleventh pipes flows to the other of the first heat exchanger or the second heat exchanger. The first drive system valve and the second drive system valve can switch the heat storage state and the heat dissipation state from each other.

Accordingly, the temperature of an equipment used for driving the vehicle can be adjusted by the cooling water circuit. When the temperature of the first heat exchanger or the second heat exchanger reaches a temperature at which frost is formed, the heat stored in the cooling water circulating in the drive system cooling unit and the eleventh pipe is used for defrosting the first heat exchanger or the second heat exchanger.

According to the thirteenth aspect, the controller controls the first drive system valve and the second drive system valve to set the heat storage state when the temperature of the cooling water flowing through the drive system cooling unit or the eleventh pipe is lower than a predetermined temperature threshold. Further, when the temperature of the cooling water flowing through the drive system cooling unit or the eleventh pipe is higher than a predetermined temperature threshold value, the controller controls the first drive system valve and the second drive system valve to set the heat dissipation state. Accordingly, the cooling water circuit can adjust the temperature of the equipment used for driving the vehicle.

According to the fourteenth aspect, the controller controls the first drive system valve and the second drive system valve to set the heat storage state when the first heat exchanger or the second heat exchanger does not frost. Further, when the first heat exchanger or the second heat exchanger is frosted, the controller controls the first drive system valve and the second drive system valve to set the heat dissipation state.

Accordingly, when the first heat exchanger or the second heat exchanger is frosted, the first heat exchanger or the second heat exchanger can be defrosted by the cooling water flowing through the ninth to eleventh pipes.

According to the fifteenth aspect, the cooling water circuit further includes a battery cooling unit, a twelfth pipe, a thirteenth pipe, and a battery cooling valve. The battery cooling unit exchanges heat between a battery mounted on the vehicle and the cooling water. The twelfth pipe connects the battery cooling unit and the fourth pipe. The thirteenth pipe connects the battery cooling unit and the fifth pipe. The battery cooling valve controls the flow rate of the cooling water circulating in the path including the heat-absorbing heat exchanger and the battery cooling unit. The second water pump is provided at a position where the cooling water is circulated in the path including the heat-absorbing heat exchanger and the battery cooling unit.

Accordingly, the temperature of the battery mounted on the vehicle can be controlled by the cooling water circuit having the battery cooling unit, the twelfth pipe, the thirteenth pipe, the battery cooling valve, and the second water pump.

What is claimed is:

1. A cooling water circuit comprising:
   a heat-radiating heat exchanger in which a cooling water is heated by heat radiated from an external heat medium;
   a heat-absorbing heat exchanger in which a cooling water is cooled by heat absorbed by an external heat medium; and
   a first heat exchanger and a second heat exchanger in which heat is exchanged between the cooling water and outside air, wherein
   when a high-temperature cooling water heated by the heat-radiating heat exchanger flows through the first heat exchanger and the second heat exchanger, the first heat exchanger and the second heat exchanger are connected in series for the cooling water to flow,
   when a low-temperature cooling water cooled by the heat-absorbing heat exchanger flows through the first heat exchanger and the second heat exchanger, the first heat exchanger and the second heat exchanger are connected in parallel for the cooling water to flow,
   the first heat exchanger and the second heat exchanger are arranged in a flow direction of the outside air,
   the first heat exchanger is arranged downstream of the second heat exchanger in the flow direction of the outside air,
   when the high-temperature cooling water heated by the heat-radiating heat exchanger flows through the first heat exchanger and the second heat exchanger, the cooling water flows in order of the first heat exchanger and the second heat exchanger,
   the first heat exchanger has a first inlet/outlet and a second inlet/outlet communicated with each other,
   when the high-temperature cooling water heated by the heat-radiating heat exchanger flows through the first heat exchanger, the cooling water flows in order of the first inlet/outlet and the second inlet/outlet, and
   when the low-temperature cooling water cooled by the heat-absorbing heat exchanger flows through the first heat exchanger, the cooling water flows in order of the second inlet/outlet and the first inlet/outlet.

2. The cooling water circuit according to claim 1, further comprising a refrigeration cycle, wherein
   the heat-radiating heat exchanger is a water cooling condenser in which the cooling water is heated by a high-pressure side refrigerant flowing on a high pressure side in the refrigeration cycle, and
   the heat-absorbing heat exchanger is a chiller in which the cooling water is cooled by a low-pressure side refrigerant flowing on a low pressure side in the refrigeration cycle.

3. The cooling water circuit according to claim 2 further comprising: a controller configured to control a flow of the cooling water so as to condition air for a cabin, wherein the controller controls the high-temperature cooling water heated by the water cooling condenser to flow in series between the first heat exchanger and the second heat exchanger when a sum of an amount of work that a compressor of the refrigeration cycle compresses the refrigerant circulating in the refrigeration cycle and an amount of heat absorbed by the low-pressure side refrigerant from an air in the cabin is larger than an amount of heat required for air-conditioning, and the controller controls the low-temperature cooling water cooled by the chiller to flow in parallel between the first heat exchanger and the second heat exchanger when the sum of the amount of work that the compressor compresses the refrigerant circulating in the refrigeration cycle and the amount of heat absorbed by the low-pressure side refrigerant flowing in the refrigeration cycle from the air in the cabin is smaller than or equal to the amount of heat required for air-conditioning.

4. The cooling water circuit according to claim 3, wherein the controller controls the high-temperature cooling water heated by the water cooling condenser to flow in series between the first heat exchanger and the second heat exchanger when cooling the cabin, and the controller controls the low-temperature cooling water cooled by the chiller to flow in parallel between the first heat exchanger and the second heat exchanger when heating the cabin.

5. The cooling water circuit according to claim 1, wherein the first heat exchanger and the second heat exchanger are integrally formed with each other.

6. A cooling water circuit comprising:

a heat-radiating heat exchanger in which a cooling water is heated by heat radiated from an external heat medium;

a heat-absorbing heat exchanger in which a cooling water is cooled by heat absorbed by an external heat medium; and a first heat exchanger and a second heat exchanger in which heat is exchanged between the cooling water and outside air, wherein when a high-temperature cooling water heated by the heat-radiating heat exchanger flows through the first heat exchanger and the second heat exchanger, the first heat exchanger and the second heat exchanger are connected in series for the cooling water to flow, and when a low-temperature cooling water cooled by the heat-absorbing heat exchanger flows through the first heat exchanger and the second heat exchanger, the first heat exchanger and the second heat exchanger are connected in parallel for the cooling water to flow, the cooling water circuit further comprising:

a first pipe connecting the heat-radiating heat exchanger and the first heat exchanger;

a second pipe connecting the first heat exchanger and the second heat exchanger;

a third pipe connecting the second heat exchanger and the heat-radiating heat exchanger;

a fourth pipe connecting the heat-absorbing heat exchanger and the second pipe;

a fifth pipe connecting the first pipe, the third pipe, and the heat-absorbing heat exchanger;

a water pump configured to circulate the cooling water in the cooling water circuit; and a valve configured to control a flow rate of the cooling water flowing through the first heat exchanger or the second heat exchanger to the heat-radiating heat exchanger and a flow rate of the cooling water flowing through the first heat exchanger or the second heat exchanger to the heat-absorbing heat exchanger.

7. The cooling water circuit according to claim 6, further comprising:

a heater core configured to exchange heat with air supplied to a cabin;

a sixth pipe connecting the heater core and the first pipe; and a seventh pipe connecting the heater core and the third pipe.

8. The cooling water circuit according to claim 7, wherein the valve includes a first valve configured to control a flow rate of the cooling water flowing through the heat-radiating heat exchanger to the first heat exchanger and a flow rate of the cooling water flowing through the heat-radiating heat exchanger to the heater core, and a second valve configured to control a flow rate of the cooling water flowing through the second heat exchanger to the heat-radiating heat exchanger and a flow rate of the cooling water flowing through the second heat exchanger to the heat-absorbing heat exchanger, and the water pump includes a first water pump configured to circulate the cooling water in a path including the heat-radiating heat exchanger, and a second water pump configured to circulate the cooling water in a path including the heat-absorbing heat exchanger.

9. The cooling water circuit according to claim 8, further comprising:

a drive system cooling unit in which heat is exchanged between an equipment configured to drive a vehicle and the cooling water;

an eighth pipe connecting the third pipe and the fourth pipe;

a ninth pipe connecting one flow path of the drive system cooling unit and a first drive system valve;

a tenth pipe connecting the other flow path of the drive system cooling unit and the third pipe;

an eleventh pipe connecting the one flow path of the drive system cooling unit and the other flow path of the drive system cooling unit;

the first drive system valve provided at a connection point among the second pipe, the fourth pipe, and the ninth pipe; and a second drive system valve provided at a connection point among the one flow path of the drive system cooling unit, the ninth pipe and the eleventh pipe, wherein the first drive system valve and the second drive system valve are configured to set and switch a heat storage state in which the cooling water flowing through any of the first to eighth pipes flows to the first heat exchanger and the second heat exchanger, and the cooling water flowing through any of the ninth to eleventh pipes does not flow to the first heat exchanger and the second heat exchanger, and a heat dissipation state in which the cooling water flowing through any of the first to eighth pipes flows to either the first heat exchanger or the second heat exchanger, and the cooling water flowing through any of the ninth to eleventh pipes flows through the other of the first heat exchanger or the second heat exchanger.

10. The cooling water circuit according to claim 9, wherein
- the controller controls the first drive system valve and the second drive system valve to set the heat storage state when a temperature of the cooling water flowing through the drive system cooling unit or the eleventh pipe is lower than a predetermined temperature threshold value, and
- the controller controls the first drive system valve and the second drive system valve to set the heat dissipation state when the temperature of the cooling water flowing through the drive system cooling unit or the eleventh pipe is higher than a predetermined temperature threshold.

11. The cooling water circuit according to claim 9, wherein
- the controller controls the first drive system valve and the second drive system valve to set the heat storage state when the first heat exchanger or the second heat exchanger does not frost, and
- the controller controls the first drive system valve and the second drive system valve to set the heat dissipation state when the first heat exchanger or the second heat exchanger is frosted.

12. The cooling water circuit according to claim 9, further comprising:
- a battery cooling unit in which heat is exchanged between a battery mounted on the vehicle and the cooling water;
- a twelfth pipe connecting the battery cooling unit and the fourth pipe;
- a thirteenth pipe connecting the battery cooling unit and the fifth pipe; and
- a battery cooling valve configured to control a flow rate of the cooling water circulating in a path including the heat-absorbing heat exchanger and the battery cooling unit, wherein
- the second water pump is provided at a position to circulate the cooling water in the path including the heat-absorbing heat exchanger and the battery cooling unit.

* * * * *